United States Patent [19]

Moyer

[11] 4,131,940
[45] Dec. 26, 1978

[54] CHANNEL DATA BUFFER APPARATUS FOR A DIGITAL DATA PROCESSING SYSTEM

[75] Inventor: James T. Moyer, Endwell, N.Y.

[73] Assignee: International Business Machines Corporation, Armonk, N.Y.

[21] Appl. No.: 818,797

[22] Filed: Jul. 25, 1977

[51] Int. Cl.² .................. G06F 13/00; G06F 3/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,249,924 | 5/1966 | Furlong | 364/200 |
| 3,380,030 | 4/1968 | McMahon | 364/200 |
| 3,432,813 | 3/1969 | Annunziata | 364/200 |
| 3,488,633 | 1/1970 | King | 364/200 |
| 3,602,896 | 8/1971 | Zeheb | 364/200 |
| 3,626,376 | 12/1971 | Anderson | 364/200 |
| 3,643,221 | 2/1972 | Chambers | 364/200 |
| 3,699,530 | 10/1972 | Capowski | 364/200 |
| 3,916,388 | 10/1975 | Shimp | 364/200 |
| 4,020,470 | 4/1977 | Drimak | 364/200 |

Primary Examiner—James D. Thomas
Attorney, Agent, or Firm—Richard E. Bee; Saul A. Seinberg

[57] ABSTRACT

Channel data buffer apparatus for buffering data being transferred between an input/output channel unit and a main storage unit in a digital data processing system. In the disclosed embodiment, data is generally transferred between the channel unit and the data buffer (a "channel/buffer" transfer) in two-byte segments and between the main storage unit and the data buffer (a "storage/buffer" transfer) in eight-byte segments. The data buffer is comprised of eight column-forming byte-wide multi-row storage arrays each having its own address mechanism for accessing any desired row therein. Corresponding rows in the different storage arrays provide the corresponding eight-byte rows for the data buffer as a whole. For storage/buffer transfers, data buffer address circuitry is provided for enabling a group of eight contiguous bytes to be read out of or written into the data buffer on a single access even though some of the bytes may be located on one row of the data buffer and other of the bytes on the next row of the data buffer. For channel/buffer transfers, data buffer address circuitry is provided for enabling a group of two contiguous bytes to be read out of or written into the data buffer on a single access even though one of the bytes may be located on one row of the data buffer and the other of the bytes on the next row of the data buffer. For storage/buffer transfers, an eight-byte wrap-around data shifter is located between the data buffer and the main storage unit for enabling any necessary alignment or realignment of the data being transferred. These features enable data to be loaded into the data buffer in a packed manner and without regard to the storage word boundary alignments in the main storage unit. Among other things, this minimizes the hardware needed for buffering the data and improves the data chaining capability of the system.

10 Claims, 26 Drawing Figures

PARTIAL TRANSFER OPERATION (11 BYTES)

FIG. 7A — 1ST CYCLE

FIG. 7B — 2ND CYCLE

FULL TRANSFER OPERATION (64 BYTES)

FIG. 7C — 1ST CYCLE

FIG. 7D — 8TH CYCLE

PARTIAL TRANSFER OPERATION (4 BYTES)

FIG. 7E — 1ST CYCLE

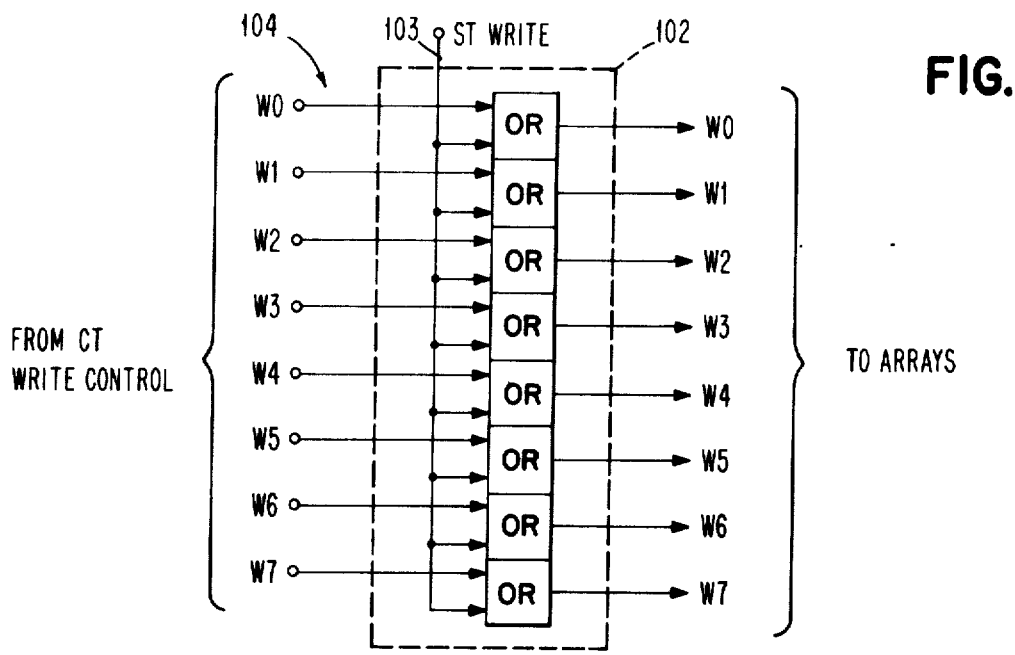
FIG. 8
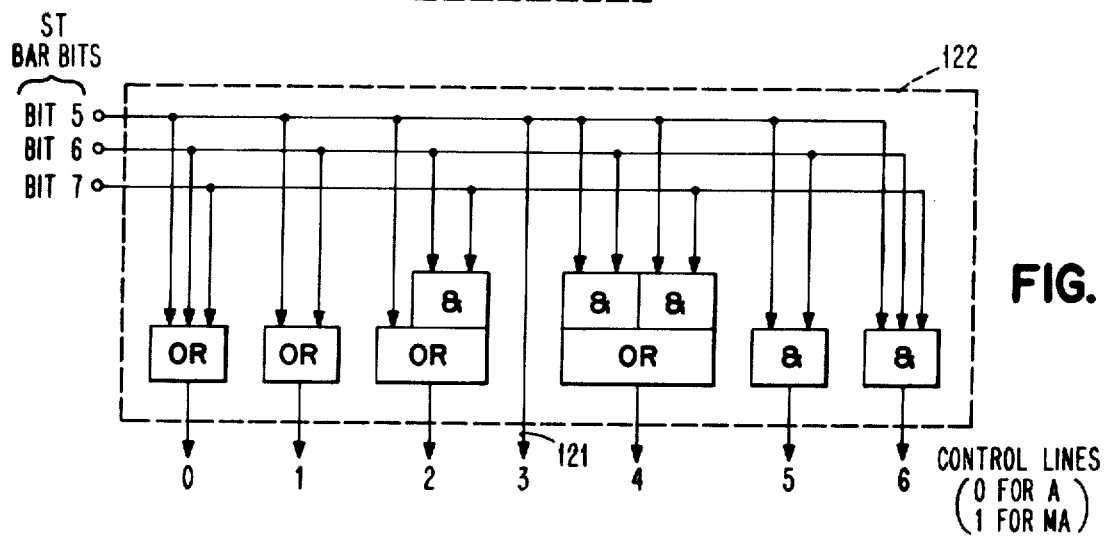
FIG. 11
| 3 LOW BITS | BYTE ARRAYS | | | | | | | |
|---|---|---|---|---|---|---|---|---|
| 5 6 7 | 0 | 1 | 2 | 3 | 4 | 5 | 6 | 7 |
| 0 0 0 | A | A | A | A | A | A | A | A |
| 0 0 1 | MA | A | A | A | A | A | A | A |
| 0 1 0 | MA | MA | A | A | A | A | A | A |
| 0 1 1 | MA | MA | MA | A | A | A | A | A |
| 1 0 0 | MA | MA | MA | MA | A | A | A | A |
| 1 0 1 | MA | MA | MA | MA | MA | A | A | A |
| 1 1 0 | MA | MA | MA | MA | MA | MA | A | A |
| 1 1 1 | MA | MA | MA | MA | MA | MA | MA | A |
ADDRESSES SENT TO BYTE ARRAYS
FIG. 12

CHANNEL DATA BUFFER APPARATUS FOR A DIGITAL DATA PROCESSING SYSTEM

PRIOR ART OF INTEREST

The following prior art patents provide useful background information for the present invention:

(1) U.S. Pat. No. 3,249,924, granted to R. J. Furlong on May 3, 1966 and entitled "Asynchronous Data Processing System";

(2) U.S. Pat. No. 3,380,030, granted to Robert F. McMahon on Apr. 23, 1968 and entitled "Apparatus for Mating Different Word Length Memories";

(3) U.S. Pat. No. 3,432,813, granted to Eugene J. Annunziata et al on Mar. 11, 1969 and entitled "Apparatus for Control of a Plurality of Peripheral Devices";

(4) U.S. Pat. No. 3,488,633, granted to Lewis E. King et al on Jan. 6, 1970 and entitled "Automatic Channel Apparatus";

(5) U.S. Pat. No. 3,602,896, granted to David Zeheb on Aug. 31, 1971 and entitled "Random Access Memory with Flexible Data Boundaries";

(6) U.S. Pat. No. 3,626,376, granted to Lawrence B. Anderson et al on Dec. 7, 1971 and entitled "Skewing Circuit for Memory";

(7) U.S. Pat. No. 3,643,221, granted to James B. Chambers on Feb. 15, 1972 and entitled "Channel Buffer for Data Processing System";

(8) U.S. Pat. No. 3,699,530, granted to Robert S. Capowski et al on Oct. 17, 1972 and entitled "Input-/Output System with Dedicated Channel Buffering"; and (9) U.S. Pat. No. 3,916,388, granted to Everett M. Shimp et al on Oct. 28, 1975 and entitled "Shifting Apparatus for Automatic Data Alignment."

All of the above-listed patents are assigned to International Business Machines Corporation of Armonk, N.Y.

BACKGROUND OF THE INVENTION

This invention relates to input/output data buffer apparatus for use with digital computers and digital data processors for buffering the transfer of data between peripheral input/output devices and a main storage unit associated with the digital computer or data processor.

A first problem encountered in the transfer of data between a peripheral input/output device and a data processor main storage unit is the difference in the length of the data segments passed to or received from the input/output device and the length of the data segments capable of being written into or read out of the main storage unit during a single access. Typically, the input/output device supplies data to or receives data from the data processor channel unit one byte at a time. Typically, the main storage unit is constructed to read or write eight bytes of data at a time. Known solutions to this problem are described in the above-listed U.S. Pat. Nos. 3,488,633 to King et al and 3,432,813 to Annunziata et al. These patents respectively describe the selector type channel unit and the multiplexer type channel unit used with the larger System/360 data processors manufactured by International Business Machines Corporation of Armonk, N.Y. In the channel units described in these patents, discrete hardware registers are used to assemble the bytes received one at a time from the input/output device. After enough bytes are accumulated to reach a storage word boundary, the assembled bytes are transferred as a group to the main storage unit. A converse procedure is followed when data is being transferred from the main storage unit to the input/output device.

The above-listed U.S. Pat. No. 3,643,221 to Chambers describes the channel buffer used in the System/370 Model 145 data processor manufactured by International Business Machines Corporation of Armonk, N.Y. In this processor, the transfer of data between the channel buffer and the main storage unit is done in four-byte, as opposed to eight-byte, segments. This channel buffer is a special type of eight-byte shift register characterized by the ability of data in each byte position to be alternatively not shifted, shifted one byte position or shifted two byte positions to the right, depending upon the full or empty conditions of the two succeeding byte positions. Data bytes received from an input/output device are entered at the left end of the shift register and the data bytes transferred to the main storage unit are taken in parallel from the rightmost four byte positions of the shift register. Conversely, when transferring data to the input/output device, the data from the main storage unit is entered in parallel into the leftmost four byte positions of the shift register and the data transferred to the input/output device is taken one byte at a time from the right end of the shift register.

The Capowski et al. U.S. Pat. No. 3,699,530, describes the channel buffer system used with the System/370 Model 165 data processor manufactured by International Business Machines Corporation of Armonk, N.Y. In this case, multiple buffers are provided for each input/output channel.

The Furlong U.S. Pat. No. 3,249,924, describes a channel buffer in the form of a one-byte wide core storage array capable of holding up to sixteen bytes of data per channel. The data bytes are transferred one at a time from the buffer to an eight-byte assembly register from whence they are transferred as a group to the main storage unit after the complete storage word is assembled in such register. The process of transferring the bytes to the assembly register is temporarily interrupted when an input/output device service request is received from a channel unit.

The mechanisms described in the patents discussed up to this point operate quite satisfactorily for their intended purposes. They are, however, not entirely suitable for use in very high-speed data processing systems having much higher data rates than those encountered in most systems currently in use. A limitation in many of the currently used systems is the time required to do the housekeeping and background chores needed to prepare the main storage unit to do the actual reading or writing of data. Thus, to obtain a higher data rate, a larger number of data bytes should be transferred to or from the main storage unit for any given performance of the background chores. In the embodiment to be described herein, up to sixty-four bytes of data are transferred between the data buffer and the main storage unit during each storage transfer operation or, in other words, for each performance of the background chores. Physically, the data is moved in eight-byte segments with up to eight such segments being transferred during any single storage transfer operation. On the average, this provides a significant reduction in the overall time required for storage transfer operations.

In order to enable these larger amounts of data to be transferred to or from the main storage unit in a very short interval of time, the channel data buffer must provide considerably more data buffering than is provided in the above-described data buffers. In other words, the storage capacity of the data buffer must be considerably greater. For reasons of economy and the like, this increased buffering capacity is preferably provided by using a semiconductor integrated circuit type storage array as the data buffer. The use of a storage array as a channel data buffer, however, presents data alignment problems relative to the data processor main storage unit.

For purposes of transferring data from a channel buffer storage array to the main storage unit, for example, the data read out of the channel buffer array during a single access should have the same boundary alignment as is needed by the main storage unit. This can be accomplished by the proper placement of data in the buffer array. This, however, complicates the transfer of data from the channel unit to the buffer array. It would be better and easier to simply pack the data from the channel unit into the buffer array in the order in which it is received and without regard to any main storage alignment requirements. Also, when the data in the channel buffer array is main storage aligned, the data chaining capability is poor. Thus, the packing of data into the buffer array without arbitrary gaps caused by main storage alignment restrictions would also improve the data chaining capability.

Similar considerations apply where the data is being transferred in the opposite direction, namely, from the main storage unit to the channel unit.

The above-listed U.S. Pat. Nos. 3,380,030 to McMahon and 3,626,376 to Anderson et al address the problem of data alignment when transferring data between a channel data buffer memory and a main storage unit. The McMahon patent describes a gating and hardware register arrangement for transferring data between two storage units having different storage word lengths or data access lengths. Two machine cycles or storage access operations are required to complete a transfer when the data to be transferred lies on two different rows in the source storage unit. Among other things, the McMahon apparatus is slower and requires more control hardware than is desired for present purposes.

The Anderson et al patent describes a skewing circuit for skewing to the right data bytes being transferred from the data buffer memory to the main storage unit when the starting byte position in the main storage unit lies to the right of the leftmost byte position. A hardware register is provided for catching and holding any bytes which are skewed past the right-hand boundary of the main storage unit. On subsequent transfers, data is transferred simultaneously from the data buffer and the hardware register to form a complete word for storage in the main storage unit, any used bytes from the data buffer being thereafter entered into the hardware register and saved for a subsequent main storage access. Unfortunately for present purposes, the Anderson et al apparatus requires the use of an additional hardware register and, in addition, does not take into account the case where the starting byte position in the data buffer is not the leftmost byte in the data buffer.

Though making no mention of channel data buffers, U.S. Pat. Nos. 3,602,896 to Zeheb and 3,916,388 to Shimp et al are of interest in that they relate to the alignment of data being transferred to or from a main storage unit, the data in these cases being sent to or received from the instruction processing unit. The Zeheb patent describes a three-dimensional core-type random access main storage unit having a four-byte storage word or storage access length and core drive line control circuitry whereby the four bytes being accessed may start on any byte position of a four-byte storage word. Thus, the accessed four-byte data word may overlap one storage word boundary into an adjacent storage word. This circumvents the storage alignment problem and enables any four contiguous bytes to be accessed during a single storage access.

The Shimp et al patent describes an eight-byte data shifter for automatically aligning a multibyte data segment accessed from a main storage unit so that it may be loaded into a processor register in a right-justified manner. Conversely, it also automatically shifts data taken from a processor register so that it will have the proper alignment when it is set into the main storage unit. Two main storage access operations are required when the data segment lies across a storage word boundary. This data shifter is of particular interest in that, as will be seen, it can also be used to provide the data shifting action used in connection with the present invention.

The above-cited prior art patents represent what applicant considers to be the best of the prior art presently known to him. No representation is made or intended, however, that better prior art does not exist. Nor is any representation made or intended that the foregoing interpretations are the only interpretations that can be placed on this prior art.

SUMMARY OF THE INVENTION

It is an object of the present invention to provide new and improved channel data buffer apparatus for enabling data to be transferred between an input/output channel and a data processor storage unit in a more efficient and less time-consuming manner.

It is another object of the invention to provide new and improved channel data buffer apparatus which simplifies the data handling and minimizes the hardware needed for transferring data between an input/output channel and an array type data buffer.

It is a further object of the invention to provide new and improved channel data buffer apparatus which simplifies the data handling and minimizes the hardware needed for transferring data between an array type data buffer and a data processor storage unit.

It is an additional object of the invention to provide new and improved channel data buffer apparatus for improving the channel data chaining rate in a digital data processing system.

In accordance with the invention, there is provided data buffer apparatus for use in a data processing system having channel circuitry for sending data to and receiving data from input/output devices and a main storage unit for storing data to be processed. The apparatus includes a data buffer for buffering data being transferred between the channel circuitry and the main storage unit. The data buffer is structured to electrically provide a plurality of columns and rows. Each column thereof is comprised of a byte-wide multiple row storage array having its own address mechanism for accessing any desired one of the rows therein. The corresponding rows in the different arrays serve to provide plural-byte rows for the data buffer as a whole. The apparatus further includes plural-byte data transfer circuitry for transferring plural-byte data segments between the data buffer and at least one of the channel circuitry and the main storage unit. The apparatus also includes data buffer address circuitry operatively coupled to said main storage unit and said channel circuitry for supplying a plural-bit address obtained therefrom to the address mechanism of each storage array. Such address circuitry includes circuitry for modifying the address supplied thereby to at least one of the address mechanisms when said plural bit address requires simultaneous accessing of a plural-byte storage segment located on two different rows of two columns of the data buffer.

For a better understanding of the present invention, together with other and further objects and features thereof, reference is made to the following description taken in connection with the accompanying drawings, the scope of the invention being pointed out in the appended claims.

BRIEF DESCRIPTION OF THE DRAWINGS

Referring to the drawings:

FIGS. 7A–7E are a series of diagrams used to illustrate a typical transfer of data from the channel data buffer to the main storage unit;

FIG. 8 is a schematic block diagram showing in greater detail the construction of the write drive unit shown in FIG. 5a;

FIG. 9 is a schematic block diagram showing in greater detail the construction of the ST (storage transfer) buffer address control unit of FIG. 5a;

FIG. 11 shows in greater detail the construction of the control logic unit used in the ST buffer address control unit of FIG. 9;

FIG. 12 is a chart used in explaining the operation of the ST buffer address assembler of FIG. 9;

FIG. 13 is a schematic block diagram showing in greater detail the construction of the CT (channel transfer) buffer address control, the CT write control and the CT read control of FIG. 5a;

FIG. 14 shows in greater detail the construction of the CT buffer address counter of FIG. 5a;

FIG. 15 shows in greater detail the construction of the ST buffer address counter and transfer control unit of FIG. 5a; and FIG. 16 shows in greater detail the construction of the data buffer count control unit of FIG. 5a.

DESCRIPTION OF THE PREFERRED EMBODIMENT

Figure 1:
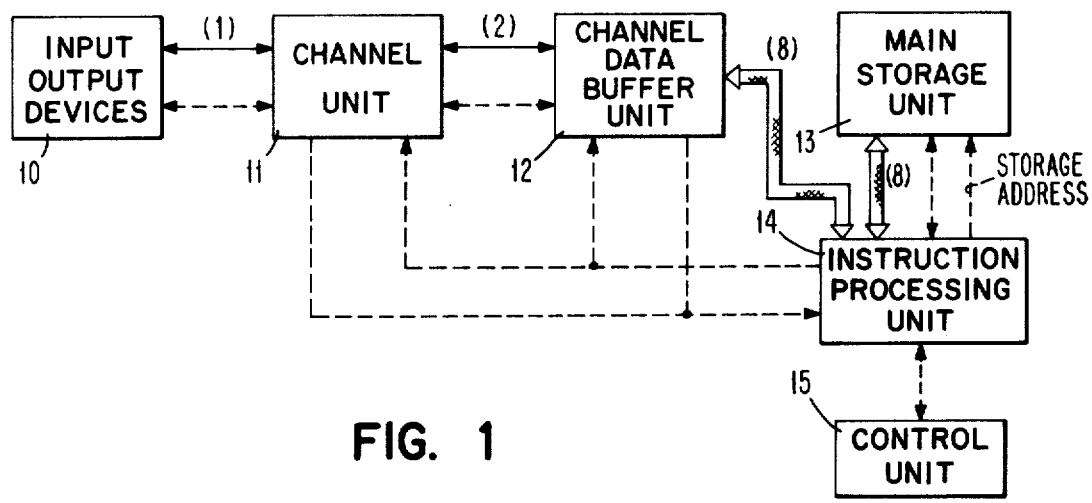
FIG. 1 is a high level block diagram showing the principal units of a typical digital data processing system and showing the location in such system of a channel data buffer unit constructed in accordance with the present invention.

Referring to FIG. 1, there is shown in a general manner the major functional units or sections of a typical digital computer or digital data processor system wherein the present invention may be used to advantage. The solid line interconnections represent data signal buses and the broken line interconnections represent control signal buses. For the case of an input/output device read operation, data is transferred one byte at a time from one of peripheral input/output (I/O) devices 10 to an I/O channel unit 11. The data is then transferred by way of a two-byte data bus to an array type channel data buffer unit 12 for temporary storage therein. The data accumulated in the data buffer unit 12 is at appropriate intervals transferred by way of eight-byte data buses to a main storage unit 13 (via a portion of an instruction processing unit 14). For an input/output device write operation, the movement of data is in the opposite direction, namely, from the main storage unit 13 to one of I/O devices 10 by way of instruction processing unit 14, the data buffer unit 12 and the channel unit 11. The data buffer unit 12 is constructed in accordance with the present invention and serves to optimize the overall data transfer process so that, in spite of the differing operating requirements of the channel unit 11 and the main storage unit 13, data can be transferred from one to the other at a relatively high rate.

In a typical case, the instruction data and operand data for a particular computer program are transferred in the foregoing manner from a peripheral device 10 to the main storage unit 13. In this case, the peripheral device 10 may take the form of, for example, a card reader or a magnetic tape unit. Thereafter, the program is executed by the instruction processing unit (IPU) 14. The instruction processing unit 14 fetches the instructions and operands from the main storage unit 13 in a sequential manner, performs the computations or other procedures indicated by the instructions and returns the results back to the main storage unit 13. Up to eight bytes of data can be transferred from the main storage unit 13 to the instruction processing unit 14 or vice versa at any given instant by way of an eight-byte data bus interconnecting these units. The elemental operations performed in the instruction processing unit 14 are controlled by control signals provided by a primary or main control unit 15. In the case of an I/O operation, some of these control actions serve to develop further control signals which are supplied to the other units 11–13. For control purposes, units 11–13 send various status and request signals to the instruction processing unit 14. IPU 14, in turn, makes various status signals available to the control unit 15.

At some point during or after completion of the program, the result data in the main storage unit 13 is transferred by way of the data buffer unit 12 and the channel unit 11 to an appropriate one of input/output devices 10. In this case, the peripheral device 10 may take the form of, for example, a typewriter unit or a printer unit.

At this point, it is helpful to explain some of the terminology that will be used herein. As is generally known, a "byte" is a sequence of adjacent binary digits or bits that are normally operated upon as a unit and that constitute the smallest addressable unit of data in the system. For sake of example, it is assumed herein that each byte is composed of eight binary data bits and a parity check bit. For sake of simplicity, the parity check bit will generally not be mentioned herein.

The convention used herein for numbering hardware data bit positions is to number them from left to right starting with the number zero, with the leftmost bit position being the highest order or most significant bit position and the rightmost bit position being the lowest order or least significant bit position in the group being considered. Thus, the higher the bit position number, the lower the order of significance of the bit. This same convention is followed when numbering a sequence of adjacent byte positions, the byte positions also being numbered from left to right starting with the number zero. Where the order of significance is pertinent, the left-hand byte is the higher order or more significant byte and the right-hand byte is the lower order or less significant byte.

As used herein, the term "input/output read operation" is used to refer to the case where data is being read out of one of the I/O devices 10. As such, this term refers to an input/output operation wherein data is being transferred from the channel unit 11 to the data buffer unit 12 and then to the main storage unit 13. This term will sometimes be abbreviated as "I/O Read" or "IOR."

As used herein, the term "input/output write operation" refers to the case where data is being written into one of the I/O devices 10. As such, this term refers to an input/output operation wherein data is being transferred from the main storage unit 13 to the data buffer unit 12 and then to the channel unit 11. This term will at times be abbreviated as "I/O Write" or "IOW."

The term "channel/buffer transfer" (or sometimes simply "channel transfer") will be used herein to refer to a transfer of data between the channel unit 11 and the data buffer unit 12 in a general sense and without limitation as to the direction of transfer. The transfer may be in either direction, namely, from the channel unit 11 to the data buffer unit 12 or vice versa.

In a similar vein, the term "storage/buffer transfer" (sometimes simply "storage transfer") will be used herein to refer to a transfer of data between the data buffer unit 12 and the main storage unit 13 in a general sense and without limitation as to the direction of transfer. The transfer may be in either direction, namely, from the data buffer unit 12 to the main storage unit 13 or vice versa.

Figure 2:
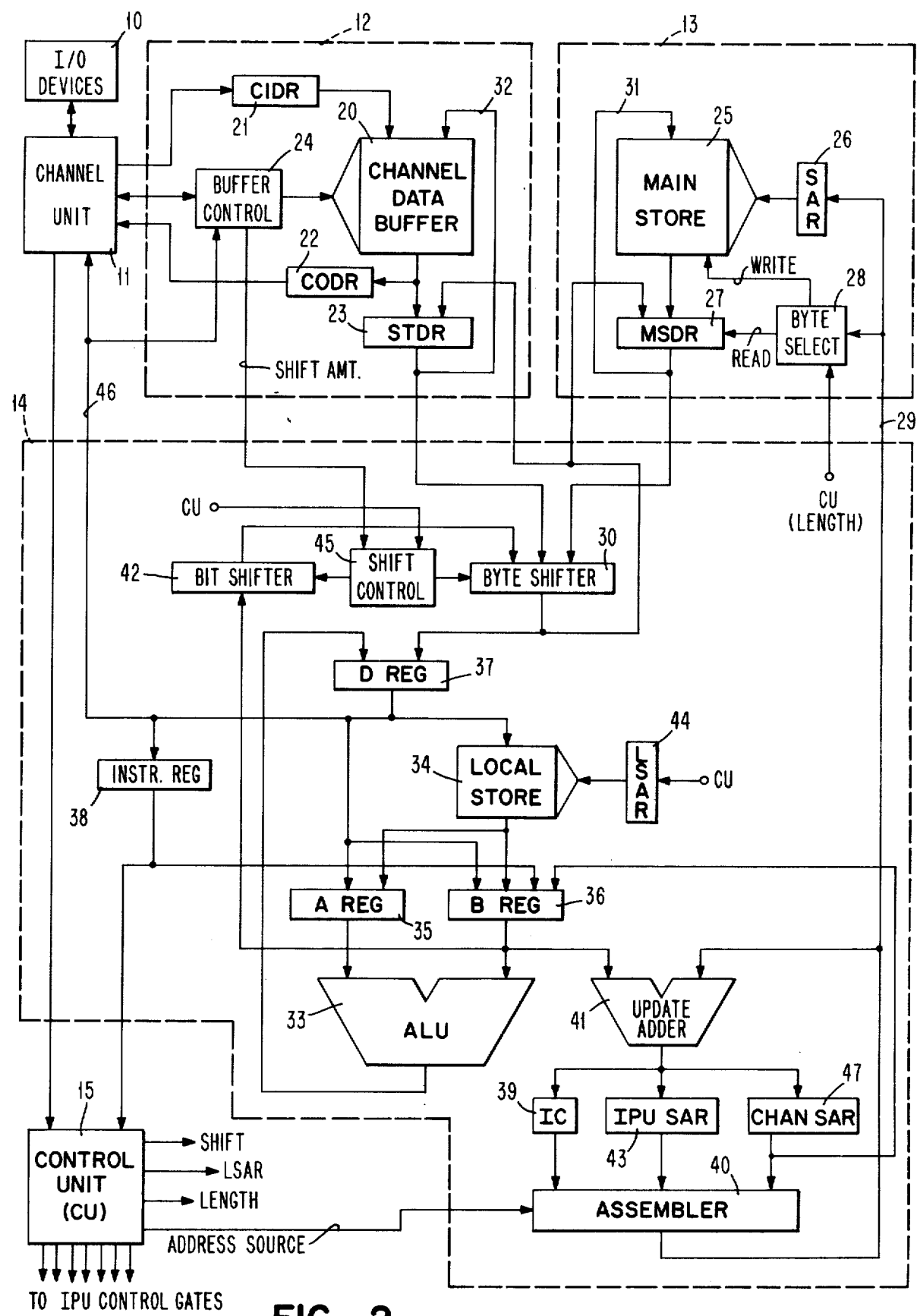
FIG. 2 is an intermediate level block diagram of the data processing system of FIG. 1 showing in greater detail the construction of the channel data buffer unit, the main storage unit and the instruction processing unit.

Referring to FIG. 2, the channel data buffer unit 12 includes a data buffer storage array 20 of the semiconductor integrated circuit nondestructive readout type for temporarily storing data. Data transfer circuitry, which includes a two-byte channel in data register (CIDR) 21, is used for transferring up to two bytes of data at a time from the channel unit 11 to the data buffer 20. Further data transfer circuitry, which includes a two-byte channel out data register (CODR) 22 is used for transferring up to two bytes of data from the data buffer 20 to the channel unit 11. An eight-byte storage transfer data register (STDR) 23 is used for transferring data from the data buffer 20 to the main storage unit 13 and vice versa. Addressing of the data buffer 20 and other control functions associated therewith are provided by a buffer control unit 24.

The main storage unit 13 includes a very large main storage array 25 which is addressed by way of a storage address register (SAR) 26. This main store 25 is of the semiconductor integrated circuit type and the readout of data therefrom is nondestructive in nature. In the present embodiment, the main store 25 has a storage access length of eight bytes. Thus, up to eight contiguous bytes of data can be written into or read out of the main store 25 during a single access thereof. The eight byte segments which are accessible during a single access are sometimes referred to as "storage words." The address of the first byte in each such "storage word" is a multiple of eight.

An eight-byte main storage data register (MSDR) 27 is used to receive the data read out of the main store 25 and to hold the data to be written into the main store 25. For transfers of less than eight bytes, a byte select unit 28 is operative during a write operation to activate less than the full complement of eight write control lines and is operative during a read operation to cause a setting of less than the full complement of eight byte positions in the main store data register 27. Byte select unit 28 is controlled by the three lowest order address bits on a storage address bus 29 and a three-bit length code obtained from the control unit (CU) 15.

In the present embodiment, the data buffer/main storage data transfer circuitry makes use of an eight-byte wide flow through type byte shifter 30 which is located in the instruction processing unit (IPU) 14 for purposes of providing the shifting action needed in various instruction processing operations. Byte shifter 30 is preferably of the type described in the above-cited U.S. Pat. No. 3,916,388 granted to Everett M. Shimp et al. In particular, byte shifter 30 is capable of shifting data in byte-size increments, either to the right or to the left. In other words, byte shifter 30 is capable of receiving eight bytes of input data and (1) passing it straight through to the output without any shifting, or (2) passing it through with a shift of anywhere from one to seven bytes to the right or (3) passing it through with a shift of anywhere from one to seven bytes to the left. The byte shifter 30 includes a wrap-around operating mode wherein data shifted out one end of the shifter is re-entered and shifted back into the other end of the shifter. This wrap-around mode is used herein when transferring data from the data buffer 20 to the main store 25 or vice versa.

The byte shifter 30 is included in the instruction processing unit 14 for purposes of providing various data shifting actions which are at times needed during the manipulation of data within the instruction processing unit 14. Also, as mentioned in the Shimp et al patent, it is used to provide any data alignment which may be needed when transferring data from the main store 25 to a hardware register in the IPU 14 or vice versa. Thus, the byte shifter 30 is needed for purposes other than just the transfer of data between the channel data buffer 20 and the main store 25. While it is, of course, more economical for the data buffer/main store transfer circuitry to share the use of the byte shifter 30, it is to be understood that this is not a mandatory requirement. If, for some reason, it is not convenient to share the IPU byte shifter or if the IPU should be of a type which does not have a wrap-around type byte shifter, then the data buffer apparatus 12 can be provided with its own separate byte shifter.

All of the primary data buses shown in FIG. 2 are eight-byte data buses with the exception of those used to transfer data between the channel unit 11 and the data buffer 20. These latter buses are two-byte data buses. Each eight-byte data bus is comprised of seventy-two conductors for simultaneously transferring seventy-two bits (sixty-four data bits plus eight parity bits) in a parallel manner. The two-byte data buses are comprised of eighteen conductors for simultaneously transferring eighteen bits (sixteen data bits plus two parity bits) in a parallel manner.

In the present embodiment, the data transfer circuitry for transferring data from the data buffer 20 to the main store 25 includes in the order named the storage transfer data register 23, the byte shifter 30, the main storage data register 27 and an eight-byte data bus 31. The data read out of the data buffer 20 is, at the appropriate moment, set into STDR 23. The data in STDR 23 flows through the byte shifter 30 and, at the appropriate moment, is set into MSDR 27. The data in MSDR 27 is supplied by way of the data bus 31 to the write circuitry in the main store 25 and, at the appropriate moment, such data is written into the main store 25 at the eight-byte storage word location specified by the address in SAR 26.

When data is transferred in the opposite direction, namely from the main store 25 to the data buffer 20, the data transfer circuitry includes MSDR 27, byte shifter 30, STDR 23 and an eight-byte data bus 32. The data is read out of the main store 25 per the address in SAR 26 and set into MSDR 27. The data in MSDR 27 flows through the byte shifter 30 and, at the appropriate moment, is set into STDR 23. The data in STDR 23 is passed by way of the data bus 32 to the write circuitry in the data buffer 20 and, at the appropriate moment, is written into the data buffer 20 at a location determined by the buffer address provided by buffer control 24.

In the present embodiment, the main control unit (CU) 15 is assumed to be of, for example, the microprogrammed type. As such, it includes a control storage unit for storing the control microwords, a control register for receiving the microwords one at a time and decoder circuitry for decoding the microwords to develop the control signals which control the various control gates (not shown) associated with the IPU data buses, address buses, etc., and to provide the various other control signals needed in the IPU. Appropriate address circuitry is provided for the control storage unit for selecting the proper starting address for the particular program instruction being executed, for accessing the microwords in a sequential manner and for branching to alternate microwords when conditions dictate.

The instruction processing unit (IPU) 14 includes an arithmetic and logic unit (ALU) 33, a local storage unit 34 and various hardware registers such as an eight-byte A register 35, an eight-byte B register 36 and an eight-byte destination (D) register 37 for use in performing the various arithmetical and logical operations on the data being processed. Briefly considering in a general way the procedure for a more or less typical machine language program instruction, the first step is to fetch the instruction from the main storage 25 and to set it into an instruction register 38. This is accomplished by taking the instruction address from an instruction counter 39 and setting it into the main storage unit SAR 26 by way of assembler 40 and the address bus 29. The addressed instruction is read from the main storage 25 and supplied to the instruction register 38 by way of MSDR 27, byte shifter 30 and destination (D) register 37. As part of the instruction fetching operation, the operand addresses are calculated from the base and displacement values contained in the instruction and such results are set into appropriate operand address registers in the local store 34. Also, the instruction counter 39 is updated by way of update adder 41 so as to contain the address of the next program instruction.

The operation code (op code) portion of the machine language program instruction in instruction register 38 is sent to the microprogrammed main control unit 15 for purposes of invoking the proper sequence of microwords for executing the particular program instruction in question. In a more or less typical case (there are many different variations), the instruction is executed by fetching the operands from the main storage 25 and setting them into appropriate registers in the local store 34. The operands are then manipulated in the desired manner and the result put back into the local store 34. The result is thereafter read from the local store 34 and written into the appropriate location (typically one of the operand locations) in the main storage 25. The transfer of data from the local store 34 to the main store 25 is accomplished by way of B register 36, a bit shifter 42, byte shifter 30, MSDR 27 and data bus 31. During these operations, the main storage 25 is addressed by way of an IPU storage address register 43, the appropriate operand addresses being supplied thereto from the local store 34. The addressing of the different register locations in local store 34 is accomplished by way of local store address register 44 which, in turn, receives from the main control unit 15 the local storage address field portion of those microwords which involve a transfer of data to or from the local store 34.

For the case of one form of arithmetic add instruction, for example, the two operands to be added are read from the main storage 25 and set into the local store 34. The two operands are thereafter successively accessed from the local store 34 and set into the A register 35 and the B register 36. The data values in the A and B registers 35 and 36 are then added by the ALU 33 and the result is sent back to the local store 34 by way of the destination register 37.

The bit shifter 42 and the byte shifter 30 are used to provide the data shifting actions which are needed during the execution of various ones of the machine language program instructions. The bit shifter 42 shifts the data in bit-size increments or steps and, as previously mentioned, the byte shifter 30 shifts the data in byte-size increments or steps. To shift a given operand residing in the local store 34, such operand is set into the B register 36 and thereafter successively passed through the bit shifter 42 and the byte shifter 30 and set into the destination register 37. From that point, it can be returned to the local store 34 or set into either the A register 35 or the B register 36, as may be required for the particular operation being performed. The bit shifter 42 as well as the byte shifter 30 are of the flow-through type. The amount of shift, if any, provided by each of these units is controlled by a shift control unit 45 which, when appropriate, receives the proper shift control information from the main control unit 15.

An input/output operation is initiated by the fetching of an I/O type instruction (for example, a START I/O instruction) from the main store 25 and the setting of such instruction into the instruction register 38. Upon commencement of the input/output operation, a unit control word (UCW) and one or more channel command words (CCW's) for the I/O device in question are fetched from the main storage 25 and set into the local store 34 in an area reserved for the particular channel unit to which the I/O device is connected. These control and command words are used to provide various control, address and status information which is needed for the performance of the input/output operation. Some of this information, for example, the command code portion of a CCW, is passed on to the channel unit 11. This is accomplished by reading the appropriate information out of the local store 34 and sending it by way of B register 36, ALU 33, destination register 37 and a control bus 46 to the channel unit 11. For example, the command code and flag byte portions of a CCW and the device address are sent in this manner to the channel unit 11 and set into hardware registers therein. Among other things, the command code is passed on to the I/O device to tell it what to do. It is also used for control purposes within the channel unit 11.

Other of the UCW/CCW information in the local store 34 is used in connection with the addressing of the main storage 25. For example, when the actual accessing of input/output data into or out of the main storage 25 is to be commenced, the data address portion of the CCW is read out of the local store 34 and set into a channel storage address register 47. From thence, it is supplied by way of the assembler 40 and the address bus 29 to the main store SAR 26 to access the starting location in the main storage 25 for the input/output data to be transferred. As the input/output operation progresses, the CCW data address field in the local store 34 is updated to keep it current.

Figure 3:
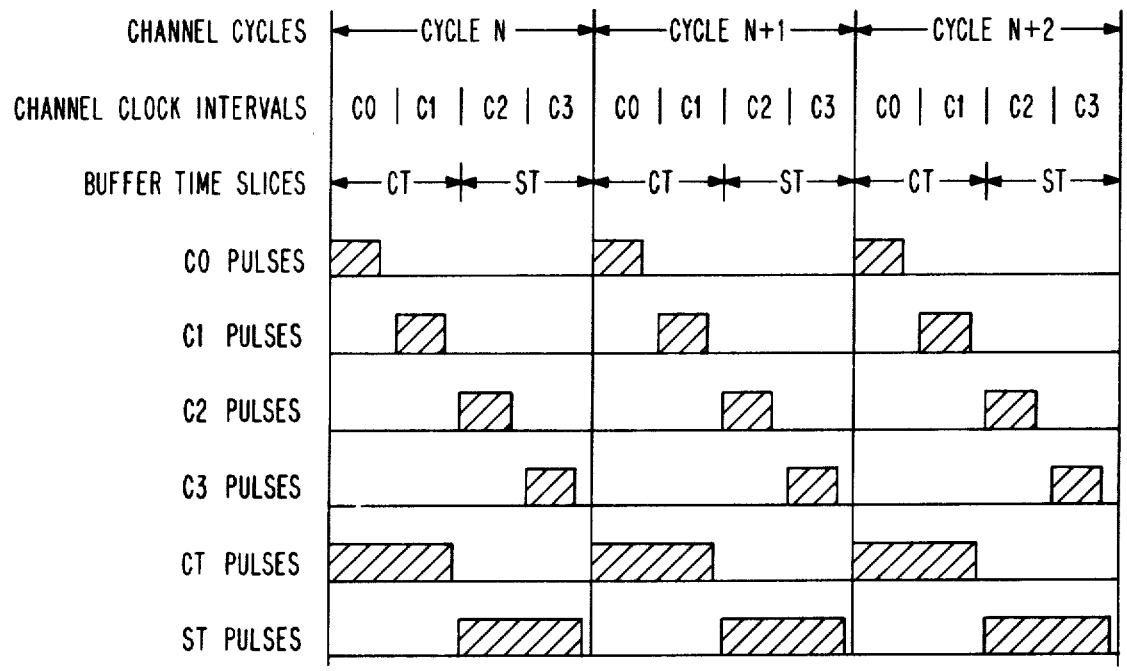
FIG. 3 is a timing diagram used in explaining the operation of the channel data buffer unit.

Referring to FIG. 3, there is shown a timing diagram which will be used in explaining the operation of the channel data buffer unit 12. As there indicated, the data buffer unit 12 uses the same basic clock pulses as are used by the channel unit 11. Each channel cycle is subdivided into four clock intervals designated C0-C3. A separate train of repetitive clock pulses is provided for each of these clock intervals. Thus, for example, a train of C0 clock pulses is provided for timing the operations to be performed during the C0 clock intervals. As will be seen, the data buffer unit 12 is operated on a split cycle basis. In particular, one half of each channel cycle is used for accessing channel data into or out of the data buffer 20, while the other half of each channel cycle is used for accessing main storage data into or out of the data buffer 20. This is represented in FIG. 3 by the subdivision of each cycle into a CT (channel transfer) time slice and an ST (storage transfer) time slice, the former occupying the first half and the latter occupying the last half of each cycle. Separate trains of repetitive CT and ST pulses are provided for timing various operations to be performed during the respective time slices. As a consequence of this split cycle operation, no interference occurs between channel/buffer transfers and storage/buffer transfers.

Figure 4:
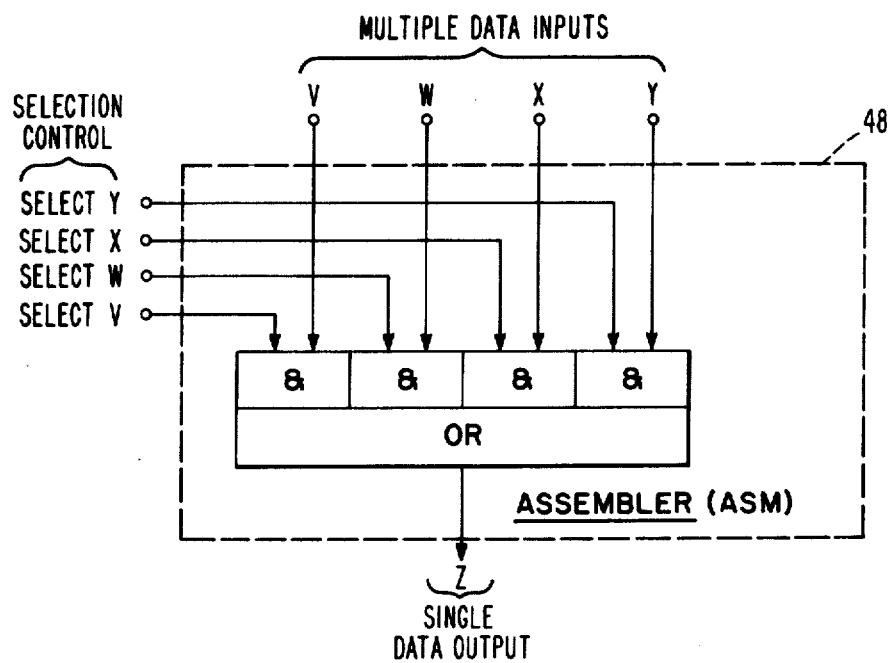
FIG. 4 is a generalized representation of an assembler unit, various forms of which are used at different places in the detailed construction of the channel data buffer unit.

FIG. 4 shows a generalized representation of an assembler (ASM) unit, various forms of which are used at different places in the detailed construction of the channel data buffer unit 12. Thus, as used in this application, the term "assembler" is intended to denote a plural-input single-output selector circuit or switching circuit which is controlled by plural selection control signals so as to transfer to the single output bus Z the data appearing on only a selected one of the plural input buses V, W, X and Y. Each of buses V-Z is of the multibit type and each has the same number of bit lines. By way of example, the raising to the binary one level of the "Select X" selection control line will connect the X input bus to the Z output bus.

Figure 5A:
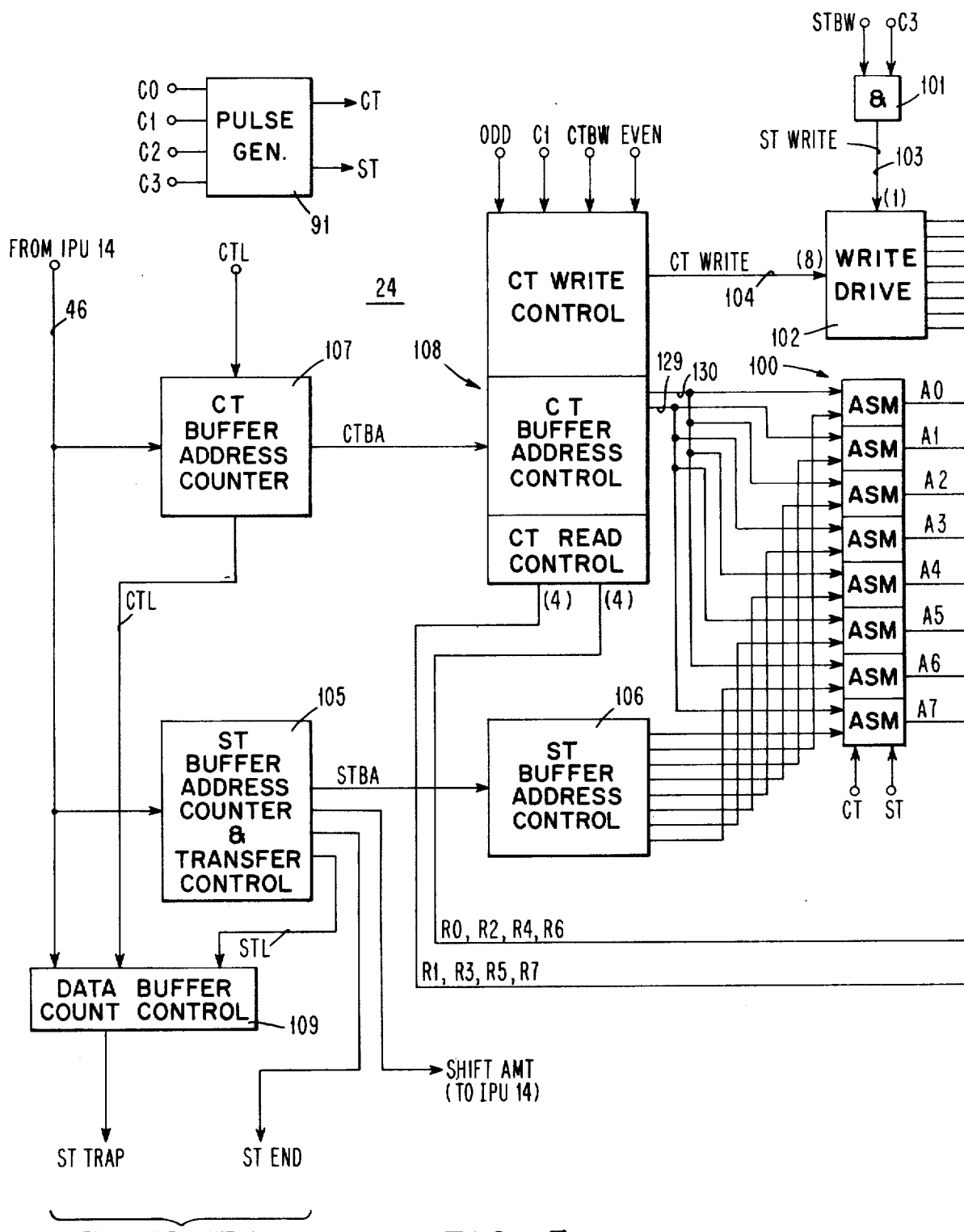
FIGS. 5a and 5b, when placed side by side, show in considerably greater detail the construction of the channel data buffer apparatus of FIG. 2.
Figure 5B:
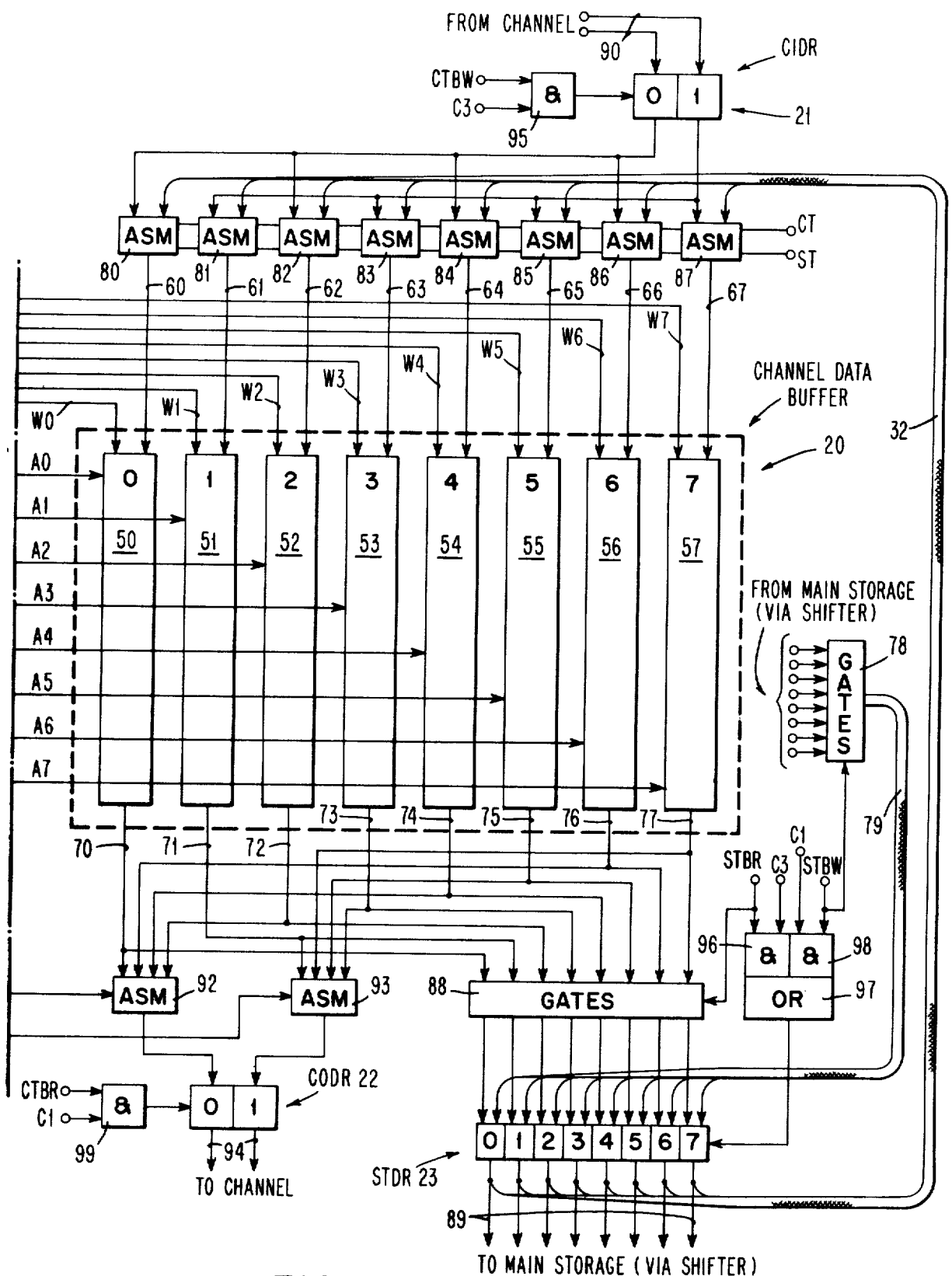

Referring now to FIGS. 5a and 5b, these figures, when placed side by side with FIG. 5a on the left, show in considerably greater detail the construction of the channel data buffer unit 12 of FIG. 2. Referring to FIG. 5b in particular, the data buffer 20 is electrically structured to provide M columns and R rows of byte-wide storage locations, where M and R are integers which are powers of two, and each of the M columns is comprised of a byte wide stoage array of R rows having its own address mechanism for accessing any desired one of the R rows therein. In the present embodiment, M has a value of eight and R has a value of thirty-two. Thus, the data buffer 20 is comprised of a set of eight column-forming storage array mechanisms 50-57. Each of these mechanisms 50-57 includes a byte-wide thirty-two row storage array and an address mechanism for accessing any desired one of the thirty-two rows therein. The storage array portion in each of the mechanisms 50-57 is of the semiconductor integrated circuit nondestructive readout type. Each row in each such byte-wide array has nine bit storage locations to provide the one-byte row length. Data is supplied to the storage array portions of the mechanisms 50-57 by means of respective ones of eight nine-bit input buses 60-67. Data is read out of the storage array portions of the mechanisms 50-57 by way of respective ones of eight nine-bit output buses 70-77.

Each of the mechanisms 50-57 also includes its own address decoder portion for receiving an r-bit address field and in response to the coding thereof selecting a particular one of the R rows in its storage array portion, r being the logarithm to the base two of R. Since R has a value of thirty-two in the present embodiment, r has a value of five. Each such address decoder is of the semiconductor integrated circuit type and is formed on the same integrated circuit chip as is its associated byte-wide storage array portion. The address applied to the address decoder accesses a particular row and causes the data stored in that row to appear on the nine-bit data output bus for that array. Addresses are supplied to the decoder portions of the mechanisms 50-57 by means of respective ones of the eight five-bit address buses A0-A7.

The storage array portion in each of the mechanisms 50-57 further includes a write control line which must be activated before data can be written into the storage array. The external extremities of these write control lines are designated as W0-W7 in FIG. 5b. Thus, for example, to write data into the eighteenth row of the Column 4 storage array, the W4 write line must be at the active level and the five-bit A4 address bus must be providing an address code of 10001. (Note: The first row has an address of 00000.) When both of these conditions are met, the binary data values appearing on the nine-bit Column 4 data input bus 64 are set into the eighteenth row of the Column 4 array.

From an overall point of view, the data buffer 20 can be thought of as being a unitary 256-byte storage array having thirty-two addressable rows with each row having a length of eight bytes. Thus, for purposes of transferring data to or from the main storage 25, eight bytes of data can be read out of or written into the data buffer 20 during a single access thereof.

It is noted that the term "array" is used in two different ways herein. It is sometimes used to refer to a single one of the byte-wide arrays 50-57. It is at other times used to refer to the complete set of eight arrays 50-57 as a single entity. Thus, the channel data buffer 20 is a storage array which is made up of eight byte-wide storage arrays. If used without qualification, the term "array" will be understood to refer to the entire collection of byte-wide arrays as a single entity.

It is to be further understood that the terms "column" and "row" are used herein in an electrical sense and not in a physical or mechanical sense. In particular, the storage locations need not necessarily be physically arranged to provide rows and columns in the physical sense. What is meant herein is that the wiring for the storage locations is such that, from an electrical standpoint, they appear to be arranged in or behave the same as though they are arranged in columns and rows.

The plural byte data transfer circuitry associated with the channel data buffer 20 includes two major portions, namely, M-byte data transfer circuitry for transferring M-byte data segments between the data buffer 20 and the main storage unit 25 and N-byte data transfer circuitry for transferring N-byte data segments between the data buffer 20 and the channel circuitry in the channel unit 11. M and N are integers, M being the number of byte columns in the data buffer 20. In the present embodiment, M has a value of eight and N has a value of two. Each of these major portions in turn includes two subportions. In particular, the M-byte or eight-byte data transfer circuitry includes first data transfer circuitry for transferring eight-byte data segments from the main storage 25 to the data buffer 20 and second data transfer circuitry for transferring eight-byte data segments in the reverse direction, namely, from the data buffer 20 to the main storage 25. In a similar manner, the N-byte or two-byte data transfer circuitry includes first data transfer circuitry for transferring two-byte data segments from the channel unit 11 to the data buffer 20 and second data transfer circuitry for transferring two-byte data segments in the opposite direction, namely, from the data buffer 20 to the channel unit 11.

Considering first the storage-to-buffer portion of the eight-byte data transfer circuitry, the portion thereof shown in FIG. 5b includes eight-byte gating circuitry 78, an eight-byte data bus 79, the storage transfer data register (STDR) 23, the eight-byte data bus 32, a set of eight one-byte assemblers 80-87 and the eight one-byte data buses 60-67. The gating circuitry 78 receives its input from the byte shifter 30 shown in FIG. 2. The numbered subdivisions of STDR 23 denote the different byte positions therein. As indicated by the fan-out from the data bus 32, the individual byte positions of such data bus 32 are coupled to different ones of the assemblers 80-87 and, hence, to different ones of the column-forming storage arrays 50-57. Thus, at the appropriate moments during an I/O Write (IOW) operation, the data in the Byte 0 position of STDR 23 is supplied to the Byte 0 column-forming array 50, the data in the Byte 1 position is supplied to the Byte 1 column-forming array 51, and so forth for the other byte positions.

Considering now the buffer-to-storage portion of the eight-byte data transfer circuitry, the portion thereof shown in FIG. 5b includes the eight one-byte array output buses 70-77, eight-byte gating circuitry 88, STDR 23 and an eight-byte data bus 89 which runs to the input side of the byte shifter 30 shown in FIG. 2. At the appropriate moments during an I/O Read (IOR) operation, bytes 0-7 of the data accessed from arrays 50-57 are set into the respective ones of the byte 0-7 positions in STDR 23. In this manner, the individual byte positions of the data bus 89 receive data from the different ones of the column-forming storage arrays 50-57.

Considering now the channel-to-buffer portion of the two-byte data transfer circuitry, the portion thereof shown in FIG. 5b includes a two-byte data bus 90, the two-byte channel-in data register (CIDR) 21, the set of eight one-byte assemblers 80-87 and the eight one-byte array input buses 60-67. The even-numbered byte position, namely, the Byte 0 position, in CIDR 21 is coupled to each of the even-numbered assemblers 80, 82, 84 and 86 and, hence, at the appropriate moments to each of the storage arrays 50, 52, 54 and 56 forming the even-numbered columns 0, 2, 4 and 6 in the data buffer 20. In a similar vein, the odd-numbered byte position, namely, the Byte 1 position, in CIDR 21 is coupled to each of the odd-numbered assemblers 81, 83, 85 and 87 and, hence, at the appropriate moments to each of the storage arrays 51, 53, 55 and 57 forming the odd-numbered columns 1, 3, 5 and 7 in the data buffer 20. As will be seen, at most only one of the even-numbered write control lines W0, W2, W4 and W6 may be energized during any given CT pulse and at most only one of the odd-numbered write control lines W1, W3, W5 and W7 may be energized during any given CT pulse interval. Thus, at most, only two bytes may be written into the data buffer 20 during any given accessing of the data buffer 20 for channel-to-buffer transfer purposes. In some cases, only a single byte, which may be either an even-numbered byte or an odd-numbered byte, will be written into the data buffer 20 during a given CT interval. In some further cases, no bytes may be written into the data buffer 20 during a given CT interval.

Each of assemblers 80-87 is a two-input, single-output version of the generalized assembler shown in FIG. 4. The storage transfer (ST) pulses are supplied to a first selection control line of each of the assemblers 80-87. Thus, during each ST pulse, the eight byte positions of the storage-to-buffer data bus 32 are connected to the corresponding ones of the eight one-byte array input buses 60-67. The channel transfer (CT) pulses, on the other hand, are supplied to a second selection control line for each of the assemblers 80-87. Thus, during each CT pulse, the output lines from the CIDR 21 are connected to the array input buses 60-67, the even-numbered output line being connected to the even-numbered array input buses and the odd-numbered output line being connected to the odd-numbered array input buses. As indicated in FIG. 3, the CT pulse occurs during the first half of each channel cycle and the ST pulse occurs during the second half of each channel cycle.

The CT and ST timing pulses are obtained from pulse generator circuitry 91 (FIG. 5a) which is driven by the C0-C3 channel clock pulses which are obtained from the channel unit 11. This pulse generating circuitry 91 may include, for example, a pair of flip flop circuits, one of which is set by the leading edge of each C0 pulse and reset by the trailing edge of each C1 pulse to produce the CT pulses and the other of which is set by the leading edge of each C2 pulse and reset by the trailing edge of each C3 pulse to produce the ST pulses.

Considering now the buffer-to-channel portion of the two-byte data transfer circuitry, the portion thereof shown in FIG. 5b includes the eight one-byte array output buses 70-77, a pair of four-input single-output assemblers 92 and 93, the two-byte channel-out data register (CODR) 22 and a two-byte data bus 94 which runs to the channel unit 11. The even-numbered array output buses 70, 72, 74 and 76 from the even-numbered byte position arrays 50, 52, 54 and 56 are coupled to the four inputs of the even-numbered assembler 92, the output of such assembler 92 being connected to the even-numbered byte position in CODR 22. In a similar fashion, the odd-numbered array output buses 71, 73, 75 and 77 from the odd-numbered byte position arrays 51, 53, 55 and 57 are coupled to the four inputs of the odd-numbered assembler 93, the output of such assembler 93 being connected to the odd-numbered byte position in CODR 22. Each of assemblers 92 and 93 is of the form shown in FIG. 4. Four even-numbered read control lines R0, R2, R4 and R6 are individually connected to the different ones of the four selection control lines of the assembler 92, the R0 line being connected to enable selection of the Byte 0 array output bus 70, the R2 line being connected to enable selection of the Byte 2 array output bus 72, etc. As will be seen, only one of the four even-numbered read control lines R0, R2, R4 and R6 can be activated at any given instant. Thus, only one at a time of the even-numbered byte arrays can be connected to the Byte 0 position in CODR 22. In a similar fashion, four odd-numbered read control lines R1, R3, R5 and R7 are connected to the four selection control lines in the assembler 93. The R1 line is connectd to enable selection of the Byte 1 array output bus 71, the R3 line is connected to enable selection of the Byte 3 array output bus 73, etc. Only one of these odd-numbered read control lines may be activated at any given instant. Thus, only one at a time of the odd-numbered array output buses 71, 73, 75 and 77 may be connected to the Byte 1 position in CODR 22.

During the course of any given input/output operation for a particular I/O device, only two of the four possible data transfer circuitry portions are utilized. The pairings are as follows:

Input/Output Device Read (IOR) Operation (1) channel transfer buffer write (CTBW) circuitry
(2) storage transfer buffer read (STBR) circuitry Input/Output Device Write (IOW) Operation (1) storage transfer buffer write (STBW) circuitry
(2) channel transfer buffer read (CTBR) circuitry The data buffer apparatus is instructed as to which type of I/O operation is to be performed by means of CTBW, CTBR, STBW and STBR control signals which are supplied thereto by the channel unit 11. These signals are obtained by a decode of the channel command code currently resident in the channel unit 11. Each of these CTBW, CTBR, STBW and STBR control signals is at the active level, in this case, the binary one level, during each channel cycle when its particular function is to be performed and each is at the inactive level, in this case, the binary zero level, during each channel cycle when its particular function is not being performed. Thus, for example, even though both the CTBW and STBR control signals are used during an I/O Read operation, there will be some channel cycles during which only the CTBW signal, and not the STBR signal, will be at the active level. The STBR signal will be at the active level for only those channel cycles during which data is actually being transferred from the data buffer 20 to the main storage 25. Similarly, for an I/O Write operation, there will be some channel cycles during which only one of the STBW and CTBR control signals will be at the active level.

The data buffer apparatus also receives from the channel unit 11 and makes use of the same C0-C3 channel clock pulses as are used in the channel unit 11.

Considering in greater detail a typical I/O Read operation, data is received from the channel unit 11 and set into the channel-in data register 21. This data is then written into or stored in the data buffer 20 in a packed manner in the order in which it is received, starting at the Byte 0 position of the first row (Row 0) of data buffer 20. After a predetermined amount of data is accumulated in the data buffer 20, the apparatus commences to read out eight bytes at a time and to transfer it to the main storage 25 by way of gating circuitry 88, STDR 23, data bus 89, byte shifter 30 (FIG. 2) and MSDR 27 (FIG. 2).

When data is being received during an I/O Read operation, the CTBW control signal is at the binary one level. This activates an AND circuit 95 to enable data to be set into CIDR 21 by the C3 clock pulses. Concurrently therewith, the appropriate write control lines (two maximum) are energized by the C1 clock pulses to write into the data buffer 20 the data set into CIDR 21. When data is to be transferred to the main storage 25 during an I/O Read operation, the STBR control signal activates the gating circuitry 88 to cause the data supplied to its input side to be passed on to its output side. This STBR control signal further activates an AND circuit 96 for enabling the C3 clock pulses to be supplied to the read-in control terminal of STDR 23 by way of such AND circuit 96 and an OR circuit 97. This enables each C3 pulse to set the data on array output buses 70–77 into STDR 23.

During an I/O Read operation, the STBW and CTBR control signals remain at the binary zero level. The zero level of the STBW signal disables the gating circuitry 78. This also disables an AND circuit 98 which would otherwise pass the C1 clock pulses by way of OR circuit 97 to STDR 23. The zero level of the CTBR signal disables an AND circuit 99 which would otherwise pass C1 clock pulses to the data set-in control line of the channel-out data register 22. Thus, no data is set into CODR 22 during an I/O Read operation.

Two separate address mechanisms are provided for the data buffer 20. During an I/O Read Operation, one controls the storage of the data coming in from the channel unit 11 and the other controls the read out of the data being transferred to the main storage unit 25. The two sets of addresses are applied to the data buffer 20 by way of a set of eight two-input, single-output assemblers 100 which serve to control the switching from one address to the other. In particular, the CT pulse supplied to each of assemblers 100 causes the five-bit channel transfer addresses to be applied to the five-bit A0–A7 address buses for the respective ones of the byte-wide storage arrays 50–57. In a similar manner, the ST pulse applied to each of the assemblers 100 causes the five-bit storage transfer addresses to be applied to the five-bit A0–A7 address buses. Since, as indicated in FIG. 3, the CT and ST pulses are occurring in an interleaved manner, the data coming in from the channel unit 11 may be stored at one location and the data read out for transfer to the main storage 25 may be taken from a different storage location during the same channel cycle.

FIGS. 6A–6F illustrate a typical manner of transferring data from the channel unit 11 to the data buffer 20. These six figures represent the data transfer for six successive channel cycles. During a first channel cycle (FIG. 6A), a first data byte, byte 0, is written or stored into the first byte-size storage location in the data buffer 20, namely, the Row 0, Column 0 location. During the second cycle (FIG. 6B), data byte 1 is stored into the Row 0, Column 1 position. During the third cycle (FIG. 6C), data byte 2 is stored into the Row 0, Column 2 position. Thus, during the first three illustrated transfers, only one byte of data is stored. During the fourth cycle (FIG. 6D), two bytes of data, namely, bytes 3 and 4, are stored into the Row 0, Columns 3 and 4 locations. During the fifth cycle (FIG. 6E), data bytes 5 and 6 are stored into the Row 0, Columns 5 and 6 locations. During the sixth cycle (FIG. 6F), data byte 7 is stored into the Row 0, Column 7 position and data byte 8 is stored into the Row 1, Column 0 position. This illustrates the case where, during a single access, it is required to access data buffer storage locations located on two different rows of the data buffer 20.

The black dots shown in some storage locations in FIGS. 6B–6F denote the presence of data, the numbers being used to indicate only the data stored during the current cycle.

For convenience of the numbering system used herein, the first data byte received from channel unit 11 during a given I/O Read operation is treated as an even-numbered byte, the next byte as an odd-numbered byte, etc. With this in mind, the even-numbered bytes are supplied to the even-numbered or Byte 0 position in CIDR 21 and the odd-numbered bytes are supplied to the odd-numbered or Byte 1 position in CIDR 21.

FIGS. 7A–7E are used to illustrate typical transfers of data from the data buffer 20 to the main storage 25. Each of FIGS. 7A–7E represents a different channel cycle. As before, the black dot in a data buffer storage location indicates the presence of data at such location, the numbers being used only for those locations of interest during the particular cycle being considered. The star at the Row 1, Column 2 location in FIG. 7A indicates that, for this particular example, there is sufficient data for initiating a storage transfer after eleven incoming data bytes from the channel unit 11 have been stored into the data buffer 20. It is further assumed that the starting byte location in the main storage 25 is the byte 5 position of some row therein or, in other words, that the three lowest order starting address bits for main storage 25 are "101."

As will be seen, the first objective is to get to an eight-byte boundary in the main storage 25. This is accomplished by reading out all of Row 0 from the data buffer 20 and setting it into STDR 23. The output of STDR 23 flows through byte shifter 30 (FIG. 2) and, at the appropriate time, is set into MSDR 27 (FIG. 2). As indicated in FIG. 7A, byte shifter 30 is set to cause a right shift of five byte positions. The byte select unit 28 (FIG. 2) causes only the three rightmost byte positions in MSDR 27 to be written into the main storage 25. As indicated in FIG. 7A, this brings the data up to an eight-byte boundary in the main storage 25.

FIG. 7B shows what happens during the next channel cycle. Again, eight more bytes are read out of the data buffer 20 and set into STDR 23. In this case, however, some of the data bytes come from Row 0 and others from Row 1 of the data buffer 20. This accessing of eight contiguous bytes from two different rows is accomplished during a single access of the data buffer 20. Thus, data bytes 3–10 are set into STDR 23 during the second channel cycle. These data bytes are right shifted by five byte positions in a wrap mode by the byte shifter 30 and the shifted data is set into MSDR 27. Data bytes 3–10 are then written into the main storage 25 on the next "row" therein.

FIGS. 7A–7E represent the case where the data length to be read from the I/O device is seventy-nine bytes and the starting location in main storage 25 does not coincide with a sixty-four byte boundary therein. In this case, a partial storage transfer operation is first performed to transfer eleven bytes of data into the main storage 25 so as to reach the next sixty-four byte boundary in the main storage 25. As indicated in FIGS. 7A and 7B, two accesses of the data buffer 20 are required to accomplish this purpose. Thereafter, after sufficient data has been accumulated in the buffer 20, a full storage transfer operation is performed to transfer the next sixty-four bytes of data to the main storage 25. This is accomplished by making eight eight-byte transfers from the data buffer 20 to the main storage 25. FIG. 7C represents the first such transfer and FIG. 7D represents the last such transfer. Thereafter, a further partial storage transfer operation is performed to transfer the remaining four bytes of data to the main storage 25, this partial transfer operation being indicated in FIG. 7E.

From the foregoing, it is seen that data from the channel unit 11 is transferred to and stored into the data buffer 20 one or two bytes at a time during successive channel cycles until all of the data has been read from the I/O device for the particular read operation in question. At appropriate interleaved points in time, data is read out of the data buffer 20 and transferred to the main storage 25 for storage therein. The data is moved to the main storage 25 eight bytes at a time and, with the possible exception of the first and last transfers, eight bytes of data are written into the main storage 25 during each access thereof. Depending on the main storage starting address and the data length being read out of the I/O device, the data written into the main storage 25 during none or one or both of the first and last transfers may be less than eight bytes. The particular input/output read operation in question is completed after the last of the data bytes has been written into the main storage 25.

Considering now the case of an input/output write operation, such operation is performed in pretty much a reverse manner to that just described for an I/O Read operation. In particular, data is read out of the main storage 25 eight bytes at a time, shifted by byte shifter 30 if ncessary, and supplied by way of gating circuitry 78 to the STDR 23. Since the STBW control signal is at the one level and the STBR control signal is at the zero level during an I/O Write operation, gating circuitry 78 is enabled to pass data signals and gating circuitry 88 is disabled. The data passed by gating circuitry 78 is set into STDR 23 by the C1 clock pulses supplied thereto via AND circuit 98. The data in STDR 23 is made available to the write circuitry of data buffer 20 by way of data bus 32 and assemblers 80–87. Each eight-byte data segment is written into the data buffer 20 during the occurrence of different ones of the C3 clock pulses supplied to an AND circuit 101. Each C3 pulse applied to AND circuit 101 activates all eight of the write control lines W0–W7. The amount of shift provided by byte shifter 30 is set so that the starting data byte taken from the main storage 25 is stored in the Column 0 position of the first row (Row 0) in the data buffer 20.

During an I/O Write operation, the AND circuit 95 remains disabled (CTBW at zero level) so that no data is set into CIDR 21. Also and more importantly, none of the write control lines W0–W7 are energized during the CT time slice intervals. Thus, only data from the main storage 25 is written into the data buffer 20 during an I/O write operation.

Note that for an I/O write operation, eight bytes are always written into the data buffer 20. During the first storage-to-buffer transfer, this may cause the storage of some undesired garbage into the data buffer 20, but this is alleviated by the fact that the undesired garbage will be overlaid by good data during the next eight-byte transfer from the main storage 25 to the data buffer 20.

For an I/O Write operation, the transfer of data from the data buffer 20 to the channel unit 11 is commenced as soon as there is available in the data buffer 20 any of the data being transferred from the main storage 25. The transfer of data to the channel unit 11 is accomplished two bytes at a time by way of the channel-out data register 22 and the two-byte data bus 94. Thus, each C1 clock pulse supplied to CODR 22 by AND circuit 99 serves to set another two bytes of data into CODR 22, the even-numbered byte being selected by assembler 92 and the odd-numbered byte being selected by assembler 93.

As before, two separate address mechanisms are coupled to the assemblers 100 so that the storage of data received from the main storage 25 may occur at a different place than the read out of the data being transferred to the channel unit 11. Because of the split cycle timing provided by the CT and ST pulses applied to the assemblers 100, the write-ins from the main storage 25 may proceed independently of the read outs of the channel unit 11 and, when necessary, eight bytes may be written in and two bytes read out during one and the same channel cycle.

For both I/O Read operations and I/O Write operations, the data buffer 20 is operated in a wrap mode. Thus, in either case, if more than 256 bytes are to be transferred during a given I/O operation, then after the last row of the data buffer 20 is filled, the buffer write operation returns to the first row (Row 0) of the data buffer 20 and continues from there until all data has been transferred or a further wrap back to Row 0 is needed. The buffer read operation wraps in a similar manner and the read and write operations are coordinated to the extent necessary to prevent new data from being overlaid on top of unread previously stored data.

Referring now to FIG. 8, there is shown in greater detail the construction of a write drive unit 102 which, as shown in FIG. 5a, provides the drive signals for the write control lines W0–W7. As seen in FIG. 8, the write drive unit 102 is comprised of a set of eight OR circuits, one input of each of which is connected to the output line 103 from the AND circuit 101 (FIG. 5a). Thus, when the STBW control signal is at the binary one level during an I/O Write operation, each C3 clock pulse serves to activate the entire set of write control lines W0–W7. During an I/O read operation, on the other hand, the W0–W7 write control lines running to the byte-wide arrays 50–57 are individually controlled by way of individual signals applied to the second inputs of the OR circuits in drive unit 102 by way of conductors 104. This control is such that none or one or two of the write control lines W0–W7 will be activated during any given channel cycle.

Referring to FIG. 5a, there is shown the major functional units included in the buffer control 24 of FIG. 2. These functional units include two separate sets of data buffer address circuitry for individually supplying plural-bit addresses to the address mechanisms of each of the byte-wide storage arrays 50–57. In particular, storage transfer (ST) data buffer address circuitry is provided for supplying plural-bit address fields to the address buses A0–A7 during the ST time slice intervals. These ST address fields are used for accessing the data buffer 20 for purposes of transferring data to or storing data received from the main storage 25. In a similar vein, channel transfer (CT) data buffer address circuitry is provided for supplying plural-bit address fields to the address buses A0–A7 during the CT time slice intervals. These CT address fields are used for accessing data buffer 20 for purposes of transferring data to or storing data received from the channel unit 11.

The storage transfer data buffer address circuitry includes a storage transfer (ST) buffer address counter and transfer control unit 105. The ST address counter portion of this unit 105 supplies a storage transfer buffer address (STBA) to an ST buffer address control unit 106. This address control unit 106, in turn, supplies a five-bit address to a first input of each of the A0–A7 address bus assemblers in the assembler group 100. Unit 105 receives various main storage address, counter reset and data length signals from the instruction processing unit 14 by way of control bus 46.

The channel transfer data buffer address circuitry includes a channel transfer (CT) buffer address counter 107 and a CT access control unit 108 which includes a CT buffer address control portion, a CT write control portion and a CT read control portion. The CT address counter 107 supplies a channel transfer buffer address (CTBA) to the address control portion in unit 108, which portion in turn supplies a five-bit address to a second input of each of the assemblers 100 which drive the address buses A0–A7. The CT write control portion of unit 108 receives the CTBW control signal and the C1 clock pulses from the channel unit 11. The CT write control portion also receives EVEN and ODD control signals from the channel unit 11. The EVEN signal is at the active level when a valid data byte is present on the portion of data bus 90 which supplies a byte of data to the even-numbered byte position (Byte 0) in CIDR 21. In a similar vein, the ODD control signal is at the active level when a valid byte of data is present on the byte portion of data bus 90 which supplies a byte of data to the odd-numbered byte position (Byte 1) in CIDR 21. The CT buffer address counter 107 receives a counter reset signal from the IPU 14 by way of control bus 46. This CT counter 107 also receives a channel transfer length (CTL) signal from the channel unit 11. This CTL signal indicates whether 0, 1 or 2 bytes of valid data are present on the data bus 90.

A data buffer count control unit 109 is also provided for, among other things, telling the channel unit 11 when sufficient data has been accumulated in the data buffer 20 for purposes of initiating a buffer-to-storage transfer. In this case, the channel unit 11 passes the appropriate control signals to the main control unit 15 (FIG. 2) for purposes of initiating the buffer-to-storage transfer.

Figure 9:
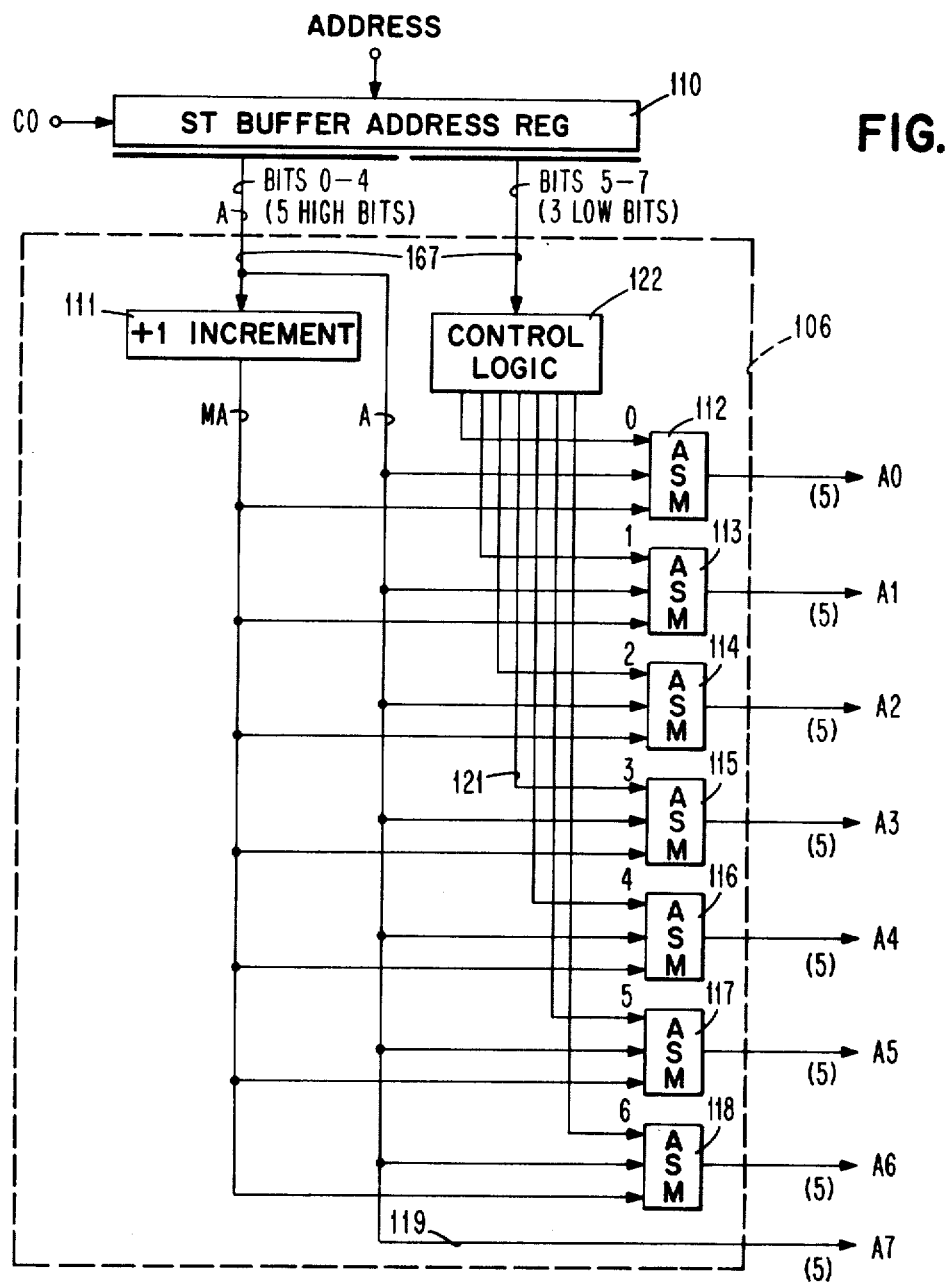

Referring now to FIG. 9, there is shown in greater detail the construction of the ST buffer address control unit 106 of FIG. 5a. Also shown is a storage transfer buffer address register (STBAR) 110 which is located in and forms part of the ST buffer address counter 105. STBAR 110 is updated as needed to contain the current starting byte location in the data buffer 20 for storage transfer purposes. The width of STBAR 110 is B bits, where B is the logarithm to the base two of the product of M times R. In the present embodiment, M (the number of columns in buffer 20) is equal to eight and R (the number of rows in buffer 20) is equal to thirty-two. Thus, in the present embodiment, M times R is equal to 256 and B is equal to eight. Thus, STBAR 110 is an eight-bit address register. This eight-bit address is sufficient for uniquely identifying any given one of the 256 one-byte locations in the data buffer 20.

The portion of the ST buffer address circuitry shown in FIG. 9 further includes circuitry responsive to the set of r higher order address bits in the storage transfer buffer address register (STBAR) 110 for producing a modified set of higher order address bits having a value one count higher than the unmodified set. As mentioned earlier, the factor r is the logarithm to the base two of R, the number of rows in the data buffer 20. In the present embodiment, R is equal to 32 and hence r is equal to five. The circuitry responsive to the set of five higher order address bits (bits 0–4) in STBAR 110 for producing the modified set of higher order address bits is represented by a +1 incrementer 111. The unmodified set of five higher order address bits is referred to as set A and the modified set is referred to as set MA. The MA address value is one count higher than the A address value.

The FIG. 9 ST address circuitry further includes selector circuitry for supplying to the address mechanism for each of the byte-wide storage arrays 50–57 (FIG. 5b) either the unmodified set of address bits A or the modified set of address bits MA. This selector circuitry is represented by a set of seven two-input single-output assemblers 112–118 and a nonswitched output bus 119. These assemblers 112–118 and the bus 119 supply the selected sets of address bits to the individual ones of the five-bit array address buses A0–A7 (FIG. 5b) by way of the corresponding ones of assemblers 100 (FIG. 5a). As indicated by the non-switched bus 119, the five-bit array address bus A7 always receives the unmodified set A of five higher order address bits during the ST time slice intervals.

Figure 10:
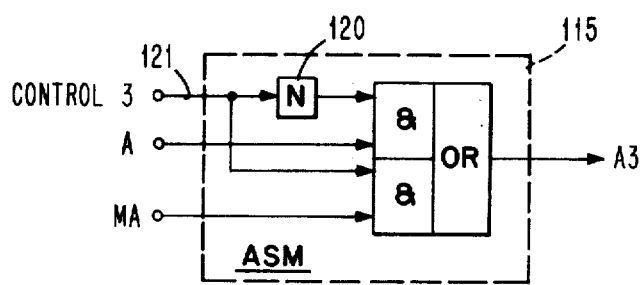
FIG. 10 shows in greater detail the construction of one of the assembler elements used in FIG. 9.

FIG. 10 shows in greater detail the construction of, for example, the assembler 115 which selects the address bits for the A3 address bus. Because of the use of a NOT circuit 120, only a single external selection control line 121 is required. If the selection control line 121 is at a binary zero level, then the unmodified set A of five address bits is passed to the five-bit A3 address bus. If, on the other hand, the selection control line 121 is at a binary one level, then the modified set MA of five address bits is instead passed to the five-bit A3 address bus.

The internal construction of the remainder of the assemblers 112–118 of FIG. 9 is the same as that shown in FIG. 10.

The ST buffer address circuitry of FIG. 9 also includes selector control circuitry coupled to the selector circuitry 112–119 and responsive to the set of m lower order address bits in STBAR 110 for determining which set of higher order address bits is supplied to each of the address mechanisms for each of the byte-wide storage arrays 50–57. The factor m is the logarithm to the base two of M, where M is the number of columns in the data buffer 20. In the present embodiment, M is equal to eight and m is equal to three. Thus, the selector control circuitry, which is represented in FIG. 9 by control logic 122, is responsive to the set of three lower order address bits (bits 5–7) in STBAR 110.

FIG. 11 shows in greater detail the construction of the control logic 122 of FIG. 9. The various output control lines numbered 0 through 6 are respectively connected to the selection control inputs of assemblers 112–118. The logic performed by the control logic 122 is represented by the table of FIG. 12. If, for example, the three low order address bits (bits 5–7) in STBAR 110 have a value of 000, then the unmodified address A is applied to each of the eight array address buses A0–A7. In this case, the eight contiguous byte locations which are accessed in the data buffer 20 all lie on the same row in the data buffer 20, such row being determined by the value of A. If, on the other hand, the three low order STBAR bits should have a value of, for example, 011, then the unmodified address A would be applied to array address buses A3–A7 and the modified address MA would be applied to the array address buses A0–A2. This represents one of the cases where it is required to access an eight-byte storage segment located on two different but adjacent rows of the data buffer 20. The value of A determines the first of the two adjacent rows and the value of MA determines the second of the two adjacent rows. Thus, for example, if A should have a value of eight (a binary value of 01000 for bits 0–4), then MA would have a value of nine (binary value of 01001 for bits 0–4) and this would correspond to the case depicted in FIG. 7D. In the FIG. 7D case, the last five bytes of Row 8 and the first three bytes of Row 9 are accessed during one and the same accessing of the data buffer 20.

Figure 13:
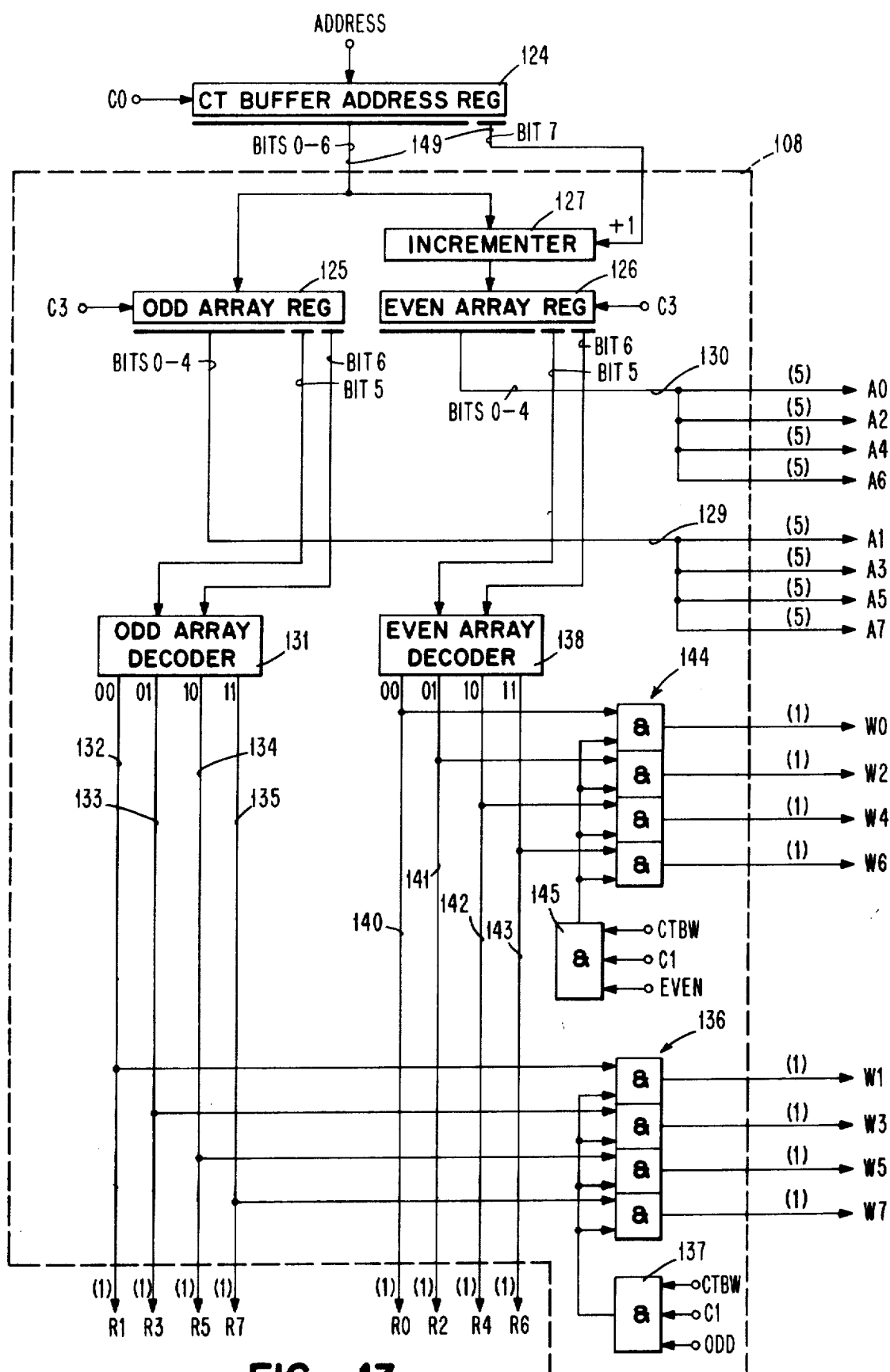

Considering now the CT buffer address circuitry and referring to FIG. 13, there is shown in greater detail the construction of the CT access control unit 108 of FIG. 5a. As mentioned, this unit 108 includes a CT buffer address control portion, a CT write control portion and a CT read control portion. The CT buffer address control portion provides the five-bit address fields which are supplied to the array address buses A0–A7 by way of the corresponding ones of the assemblers 100 during the CT time slice intervals. The CT write control portion provides the write control signals W0–W7 which are supplied to the write drive unit 102 of FIG. 5a. The CT read control portion controls the activation of the read control lines R0–R7 which run to the channel out assemblers 92 and 93 shown in FIG. 5b.

There is also shown in FIG. 13 a channel transfer buffer address register (CTBAR) 124 which is located in and forms part of the CT buffer address counter 107 (FIG. 5a). CTBAR 124 is shown in FIG. 13 for cross-reference purposes. This CTBAR 124 provides a B-bit data buffer address for addressing any desired starting byte location in the data buffer 20 during a CT time slice interval. The factor B has the same meaning as discussed above in connection with the STBAR 110. Thus, in the present embodiment, CTBAR 124 is an eight-bit address register and, as will be seen, the address residing therein is repeatedly updated during the course of an input/output operation so as to address the next desired starting byte location in the data buffer 20.

The portion of the channel transfer address circuitry shown in FIG. 13 also includes an odd array register 125 and an even array register 126 for receiving the B-1 higher order address bits (bits 0–6) from CTBAR 124. The CT address circuitry portion of FIG. 13 further includes incrementer circuitry 127 for increasing the value of the even array register 126 by a count of one when the lowest order bit (bit 7) in CTBAR 124 has a binary value of one. When bit 7 has a binary value of zero, incrementer 127 passes bits 0–6 of CTBAR 124 on to the even array register 126 without modification.

Thus, when bit 7 is zero, the binary value set into the even array register 126 is the same as the binary value set into the odd array register 125. When bit 7 is one, the binary value set into the even array register 126 is one count higher than the binary value set into the odd array register 125.

The channel transfer address circuitry further includes circuitry for supplying the set of r higher order address bits in the odd array register 125 to the address mechanisms in each of the odd-numbered byte-wide storage arrays 51, 53, 55 and 57 (the Column 1, 3, 5 and 7 arrays) in the data buffer 20. The factor r has the same meaning as before, namely, it is the logarithm to the base two of R, where R is the number of rows in the data buffer 20. In the present embodiment, R is equal to five. Thus, the five higher order address bits (bits 0–4) in the odd array register 125 are supplied by address bus 129 and the appropriate ones of assemblers 100 to each of the odd-numbered array address buses A1, A3, A5 and A7 during the CT time slice intervals.

In a similar manner, circuitry is provided for supplying the set of r higher order address bits in the even array register 126 to the address mechanisms in each of the even-numbered byte-wide storage arrays 50, 52, 54 and 56 (the Column 0, 2, 4 and 6 arrays) in the data buffer 20. In particular, the five higher order address bits (bits 0–4) in the even array register 126 are supplied to each of the even-numbered array address buses A0, A2, A4 and A6 by way of address bus 130 and the corresponding ones of assemblers 100 during the CT time slice intervals.

For the majority of data buffer 20 accesses for channel transfer purposes, the even-numbered array addresses A0, A2, A4 and A6 will be the same as the odd-numbered array addresses A1, A3, A5 and A7. In other words, in the majority of cases, the same row will be addressed in each of the eight columns of data buffer 20. On some occasions, however, like the occasion depicted in FIG. 6F, the even-numbered array addresses A0, A2, A4 and A6 will be one count higher than the odd-numbered array addresses A1, A3, A5 and A7. In other words, when the starting byte location for the channel transfer is located in the byte 7 column of buffer 20, bits 5, 6 and 7 in CTBAR 124 will have a value of 111. The +1 incrementing provided by incrementer 127 then causes a carry to be propagated into the bit 4 position of the address value passing through the incrementer 127. Thus, bits 0–4 in the even array register 126 will be one count higher than bits 0–4 in the odd array register 125. This enables an addressing of the next row in the buffer 20 for the second byte of the two-byte channel transfer. Thus, a two-byte storage segment located on two adjacent rows of the data buffer 20 can be accessed on one and the same accessing of the data buffer 20.

The channel transfer control unit 108 of FIG. 13 also includes read/write control circuitry responsive to a set of lower order address bits in the channel transfer buffer address register 124 for selecting one of the even-numbered byte-wide storage arrays and one of the odd-numbered byte-wide storage arrays in the data buffer 20 for the data transfer. This read/write control circuitry includes an odd array decoder 131 coupled to the odd array register 125 and responsive to a set of lower order address bits therein (bits 5 and 6) for selecting one of the odd-numbered byte-wide storage arrays. This odd array decoder 131 has four output lines 132–135, only one of which can be at the binary one level at any given moment. The output line which is activated is determined by the coding of bits 5 and 6, the bit 5–6 code for each of the output lines being indicated in the drawing.

For write control purposes during an I/O Read operation, the odd array decoder output lines 132–135 are individually coupled by way of individual ones of AND circuits 136 to the respective ones of the odd-numbered write control lines W1, W3, W5 and W7 which run to the data buffer 20 by way of the write drive unit 102. AND circuits 136 are controlled as a group by a further AND circuit 137 which receives the CTBW control signal, the C1 clock pulses and the ODD control signal from the channel unit 11. Thus, AND circuits 136 will be conditioned to pass signals during the C1 clock pulses but only if a CT buffer write operation is to be performed (CTBW at one level) and valid data is present in the odd-numbered Byte 1 position in the channel-in data register 21 (ODD signal at binary one level). Assuming these conditions to be met, the data byte in the Byte 1 position of CIDR 21 is written into the data buffer 20 during the occurrence of a C1 clock pulse at the column location determined by which one of the four write control lines W1, W3, W5 and W7 is at the active or binary one level (only one of these lines can be at such level during any given channel cycle) and at the row location determined by the A1, A3, A5, A7 address value. Thus, bits 0–4 of the odd array register 125 determine the row coordinate, bits 5 and 6 of the odd array register 125 determine the column coordinate and the C1 clock pulse determines the instant of time at which the odd data byte is actually written into the buffer 20. If an I/O Read operation is not being performed, then the AND circuits 136 remain disabled (CTBW remains a binary zero level) and none of the write control lines W1, W3, W5 and W7 are activated and there is no writing of data into the data buffer 20 during the channel transfer time slice intervals.

For read control purposes during an I/O Write operation, the individual ones of the output lines 132–135 of the odd array decoder 131 are connected to the respective ones of the read control lines R1, R3, R5 and R7 which run to the odd byte assembler 93 associated with CODR 22 (FIG. 5b). This enables assembler 93 to select and pass on to the odd byte position in CODR 22 only a selected one of the four odd-numbered bytes supplied to the input of the assembler 93. The odd byte selected is determined by the coding of bits 5 and 6 in the odd array register 125.

During each CT time slice interval, the array address buses A0–A7 are activated to access eight byte-size storage locations in the data buffer 20. The contents of these storage locations appear on the array output buses 70–77. One of the odd-numbered output buses 71, 73, 75 and 77 is selected by the assembler 93 and whatever appears on such bus is passed on to CODR 22. However, only the data passed by the assembler 93 during the occurrence of a C1 clock pulse during the performance of an I/O Write operation (CTBR at binary one level) is actually set into CODR 22. Data appearing at other than the C1 time is ignored. This is controlled by the AND circuit 99 (FIG. 5b) which drives the data set-in control line of CODR 22. Also, if an I/O Write operation is not being performed, then the CTBR control signal remains at the binary zero level and everything passed by the assembler 93 is ignored. Thus, for channel transfer purposes, the moment of read out from the data buffer 20 is, in effect, the moment of occurrence of the C1 clock pulse at the output of AND circuit 99.

The channel transfer read/write control circuitry further includes a similar but separate control mechanism for the even-numbered or Column 0, Column 2, Column 4 and Column 6 arrays in the data buffer 20. In particular, the read/write control circuitry further includes an even array decoder 138 coupled to the even array register 126 and responsive to a set of lower order address bits therein (bits 5 and 6) for selecting one of the even-numbered storage arrays 50, 52, 54 and 56 for the data transfer. Decoder 138 has four output lines 140–143, only one of which can be at the binary one level at any given instant. The bit 5–6 codes needed to activate the different ones of the output lines 140–143 are shown in the drawing.

For write control purposes, the individual ones of even array decoder output lines 140–143 are coupled by way of individual ones of AND circuits 144 to the respective ones of the even-numbered write control lines W0, W2, W4 and W6. AND circuits 144 are controlled as a group by a further AND circuit 145 which receives from the channel unit 11 the CTBW control signal, the C1 clock pulses and the EVEN control signal. The EVEN control signal is at the binary one level if a valid byte of data has been set into the even-numbered Byte 0 position in CIDR 21. Assuming this to be the case and also assuming that an I/O read operation is being performed and CTBW is at the binary one level, then the data in the Byte 0 position of CIDR 21 is written into the buffer 20 during the occurrence of the C1 clock pulse at an even-numbered column location determined by which one of the four W0, W2, W4 and W6 lines is at the active level and at a row location determined by the A0, A2, A4, A6 address value.

For read control purposes, the even array decoder output lines 140–143 are individually connected to the respective ones of the read control lines R0, R2, R4 and R6 which run to the even-numbered channel-out assembler 92 associated with CODR 22 (FIG. 5b). The active one of the read control lines R0, R2, R4 and R6 causes the even assembler 92 to select the corresponding one of the even array output buses 70, 72, 74 and 76 and to pass the data on the selected array output bus to the even-numbered or Byte 0 input of CODR 22. The even byte data is set into CODR 22 by the occurrence of a C1 clock pulse at the output of AND circuit 99.

As may be surmised from the foregoing descriptions of the CT access control unit 108, the channel transfer read/write control circuitry is structured to enable the byte-size storage locations in the data buffer 20 to be accessed in pairs, with one member of the pair being an even-numbered byte location and the other member of the pair being an odd-numbered byte location. The even-numbered byte locations are located in the even-numbered array columns 0, 2, 4 and 6 and the odd-numbered byte locations are located in the odd-numbered array columns 1, 3, 5 and 7. For sake of explanation herein, the term "even-odd access" will be used to describe the case where the lower-numbered storage location is an even-numbered byte location and the higher-numbered storage location is an odd-numbered byte location. This is the kind of access that is obtained when the address values in the even and odd array registers 126 and 125 are the same. The following table indicates the different write control line pairs and read control line pairs which are activated for the different bit 6–7 code values that may appear in both of the registers 125 and 126 for the case of an even-odd access.

| EVEN REGISTER EQUAL ODD REGISTER | | |
|---|---|---|
| Bit 6 – 7 Code | Active Write Lines | Active Read Lines |
| 00 | W0 – W1 | R0 – R1 |
| 01 | W2 – W3 | R2 – R3 |
| 10 | W4 – W5 | R4 – R5 |
| 11 | W6 – W7 | R6 – R7 |

In the "Active Write Lines" column, it is assumed that a two-byte access is being made. For the case of a one-byte access, the odd-numbered write line would not be activated because the ODD control signal supplied to the AND circuit 137 would be at the binary zero level.

For sake of explanation herein, the term "odd-even access" is used to refer to the channel transfer case where the lower-numbered storage location being accessed is an odd-numbered byte location and the higher-numbered storage location being accessed is an even-numbered byte location. This case occurs when the address value in the even array register 126 is one count higher than the address value in the odd array register 125. The following table shows the active write line pairs and the active read line pairs for the various bit 6–7 code relationships that can exist in the odd and even array registers 125 and 126 for the case of an odd-even access.

| EVEN REGISTER ONE COUNT HIGHER | | | |
|---|---|---|---|
| Odd Bit 6 – 7 Code | Even Bit 6 – 7 Code | Active Write Lines | Active Read Lines |
| 00 | 01 | W1 – W2 | R1 – R2 |
| 01 | 10 | W3 – W4 | R3 – R4 |
| 10 | 11 | W5 – W6 | R5 – R6 |
| 11 | 00 | W7 – W0 | R7 – R0 |

For the "Active Write Lines" column, it is assumed that a two-byte access is being made. For the case of a one-byte access, the corresponding even-numbered write control line would not be activated because the EVEN control signal supplied to the AND circuit 145 would be at the disabling binary zero level.

Figure 6A:
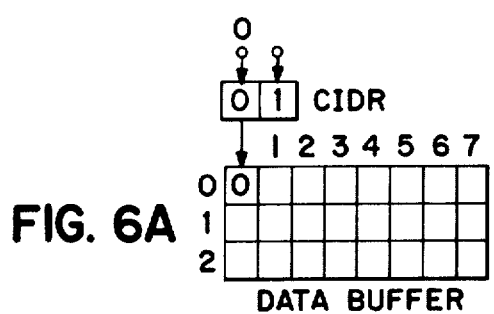
FIGS. 6A–6F are a series of diagrams used to illustrate a typical transfer of data from the channel unit to the channel data buffer.
Figure 6B:
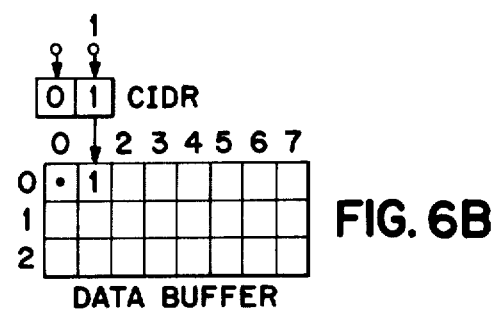
Figure 6C:
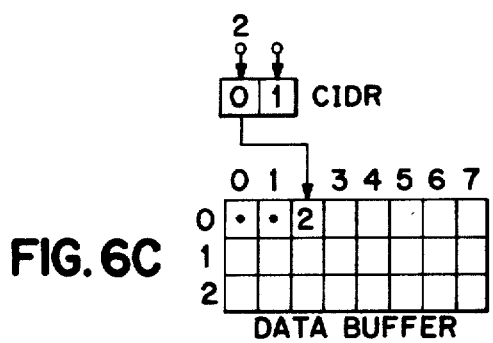
Figure 6D:
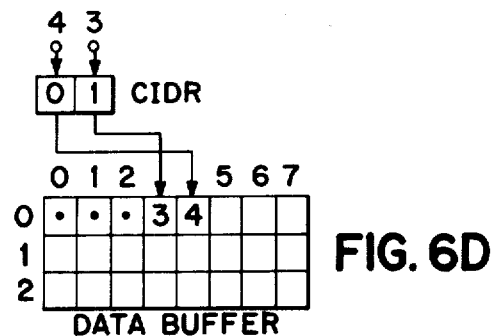
Figure 6E:
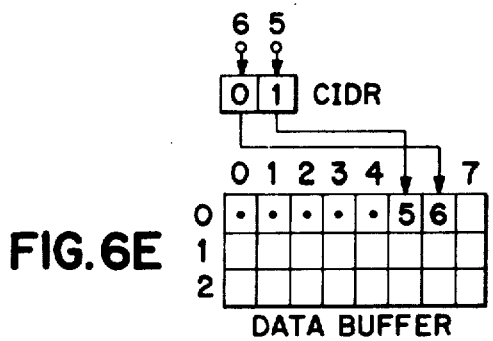
Figure 6F:
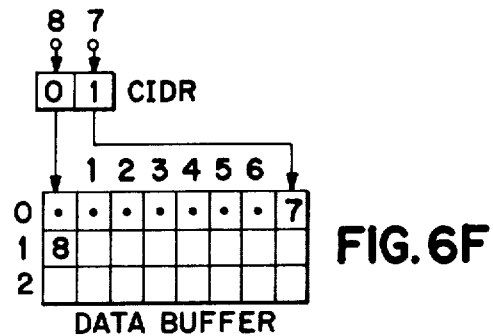

FIGS. 6D, 6E and 6F show examples of odd-even two-byte accesses of the data buffer 20 for the case of a channel-to-buffer data transfer. FIGS. 6A and 6C show examples of one-byte even-odd accesses wherein the odd-numbered write control line remains disabled and FIG. 6B shows an example of an odd-even one-byte access where the even-numbered write control line (the W2 line) remains disabled.

As is further indicated in FIGS. 6A–F, the first data byte (byte 0) received from the I/O device 10 is set into the Byte 0 position of CIDR 21, the second data byte (byte 1) received from the I/O device 10 is set into the Byte 1 position in CIDR 21, the third data byte (byte 2) is set into the Byte 0 position in CIDR 21, the fourth data byte (byte 3) is set into the Byte 1 position in CIDR 21, etc. In other words, alternately received data bytes are alternately treated as even and odd numbered data bytes, with the first received data byte being treated as an even-numbered byte. With this in mind, the even-numbered data bytes are always set into the even-numbered Byte 0 position in CIDR 21 and the odd-numbered data bytes are always set into the odd-numbered Byte 1 position in CIDR 21.

For the case of an I/O Write operation, data is transferred from the data buffer 20 to the channel-out data register 22 two bytes at a time. Depending upon the data rate of the particular I/O device 10 which is receiving the data, the data transfers from CODR 22 to the channel unit 11 may be one-byte transfers or two-byte transfers or some combination of one-byte and two-byte transfers. The channel unit 11 tells the CT address counter 107 how many bytes are taken from CODR 22 for each channel cycle. If only one byte is taken, then CTBAR 124 is updated by only one count. Thus, during the next channel cycle, one of the bytes set into CODR 22 will be a repeat of the untaken byte from the previous channel cycle.

Figure 14:
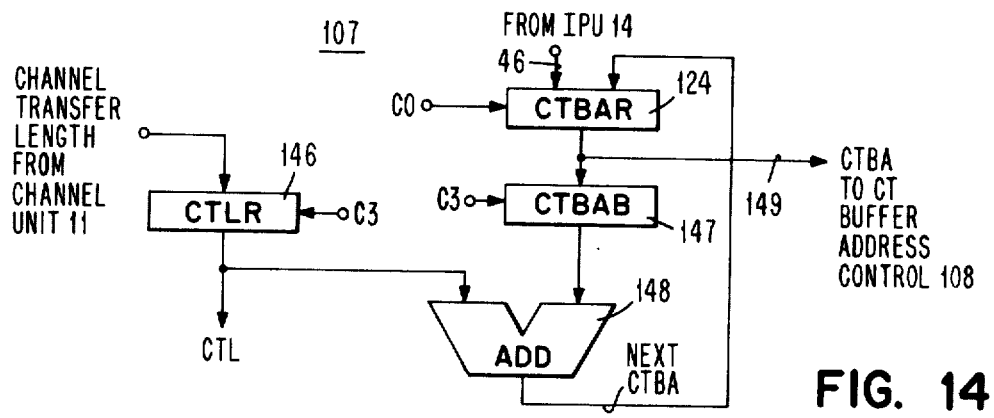

Referring now to FIG. 14, there is shown in greater detail the construction of the CT buffer address counter 107 of FIG. 5a. As mentioned and as shown in FIG. 14, the channel transfer buffer address register (CTBAR) 124 of FIG. 13 is actually a part of the CT address counter 107. The address counter 107 further includes update circuitry for updating CTBAR 124 by the number of data bytes transferred each time data is transferred between the data buffer 20 and the channel unit 11. This update circuitry includes a channel transfer length register (CTLR) 146 which receives from the channel unit 11 a two-bit code indicating the number of bytes (0, 1 or 2) to be transferred during the next channel cycle. This transfer length code is set into CTLR 146 by the C3 clock pulse occurring at the end of the then current channel cycle. This same C3 clock pulse also sets into a channel transfer buffer address buffer 147 the address value in CTBAR 124, this occurring at the same time that the CTBAR address value is set into the odd and even array registers 125 and 126 of FIG. 13. Thus, the address value in CTBAB 147 is the CT buffer address for the new current channel cycle. The binary length value in CTLR 146 is added to the binary address value in CTBAB 147 by a binary adder 148 to produce at the output of adder 148 the next channel transfer buffer address. This next CT buffer address is then set into CTBAR 124 by the C0 clock pulse for the now current channel cycle. In this manner, CTBAR 124 is updated each time data is transferred between the buffer 20 and the channel unit 11. This enables CTBAR 124 to point to the starting byte storage location in the data buffer 20 to be used for the next channel cycle during which data is to be transferred.

The next address value in CTBAR 124 is supplied by way of an eight-bit address bus 149 to the CT access control unit 108 in the manner shown in FIG. 13. CTBAR 124 may also be set to an address value supplied thereto from the IPU 14 by way of control bus 46. Typically, this is done as one of the preliminary steps for an I/O operation for purposes of resetting CTBAR 124 to zero. A further point to note is that CTBAR 124 is allowed to wrap back to zero when it reaches its maximum count condition. This enables the CT accessing of data into or out of the data buffer 20 to wrap back to Row 0 of buffer 20 when the I/O device operation involves a relatively large length of data.

Figure 15:
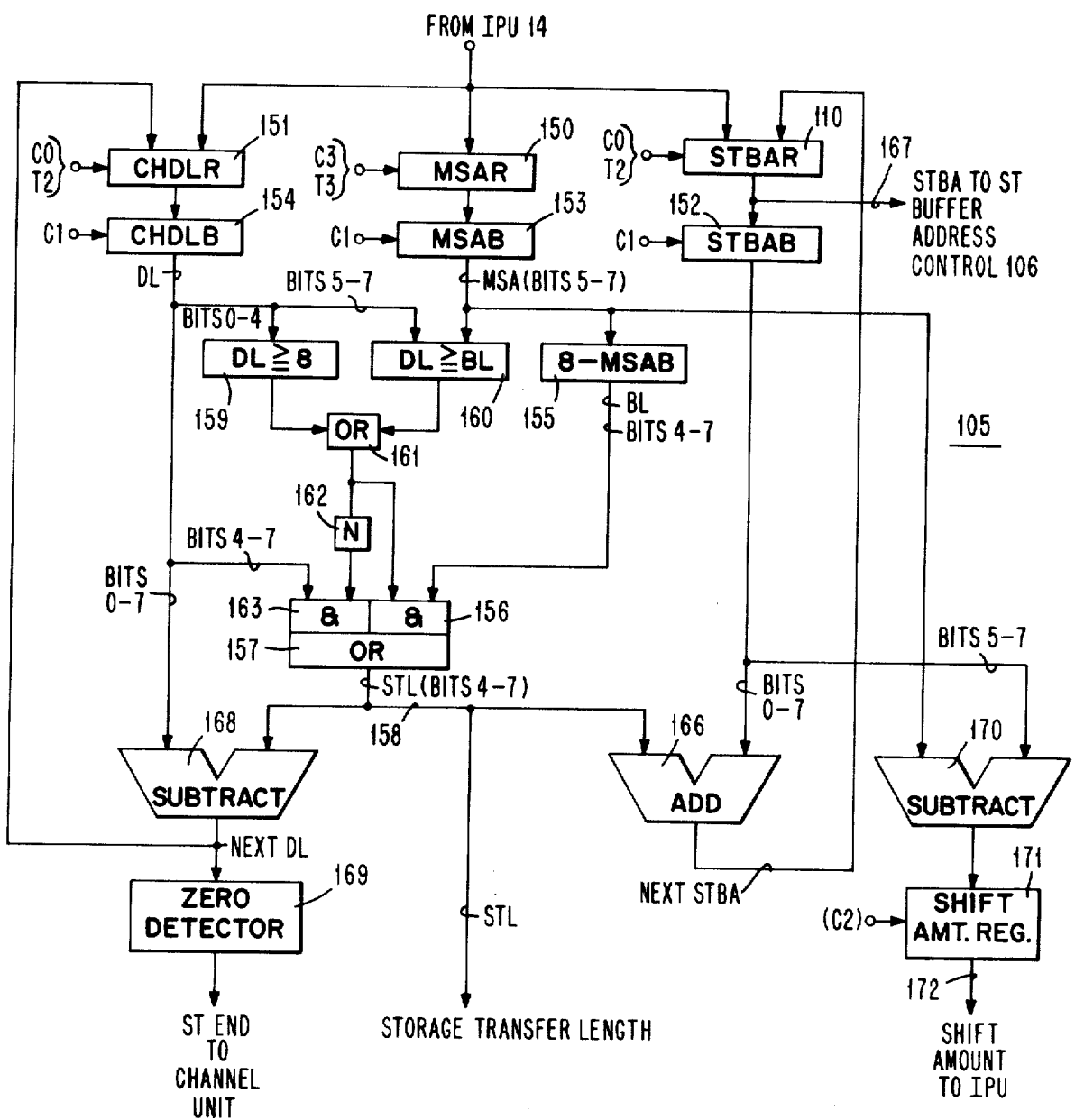

Referring now to FIG. 15, there is shown in greater detail the construction of the ST buffer address counter and transfer control unit 105 of FIG. 5a. This counter and control unit 105 includes four primary mechanisms, namely: (1) a transfer length determining mechanism for determining the number of data bytes to be transferred to or from the main storage 25 during the current channel cycle; (2) a buffer address counter mechanism for updating STBAR 110 so that it may contain the starting byte storage location address in the data buffer 20 for the current channel cycle; (3) a data length counter mechanism for determining when all the data bytes for a particular storage/buffer transfer operation have been transferred; and (4) a shift amount determining mechanism for determining the amount of shift required of the byte shifter 30 (FIG. 2). Once a particular storage/buffer transfer operation has actually commenced, the counter and control unit 105 is effective to control the movement of the data bytes between the buffer 20 and the main storage 25 without assistance from the IPU 14. This frees up the IPU 14 and allows it to perform various storage transfer related background chores which would otherwise require additional IPU time.

Each new I/O device read operation or I/O device write operation is initiated either by the fetching of a START I/O instruction from the main storage 25 to the IPU 14 or by command chaining from a previously executing channel command word. FIGS. 7A-7E show an example of an I/O device read operation wherein seventy-nine bytes of data (bytes 0-78) are to be read from a particular I/O device and transferred to and stored in the main storage 25. As indicated by FIGS. 7A-7E, each overall I/O device read or device write operation may be subdivided into two or more storage/buffer transfer operations wherein up to sixty-four bytes of data may be transferred between the buffer 20 and the main storage 25 during each such storage/buffer transfer operation.

As shown in FIG. 15, the ST counter and control unit 105 includes three primary registers, namely, the storage transfer buffer address register (STBAR) 110 previously mentioned in connection with FIG. 9, a main store address register (MSAR) 150 and a channel data length register (CHDLR) 151. These registers 110, 150 and 151 are initially set or reset by means of plural-bit binary signals which are supplied thereto from IPU 14 via the control bus 46. In particular, STBAR 110 is initially reset to an all-zero value at the beginning of each new I/O device read or I/O device write operation and is not thereafter reset by IPU 14 during the course of such device read or device write operation. MSAR 150 and CHDLR 151, on the other hand, receive from IPU 14 an initial setting at the beginning of each of the various storage/buffer transfer operations that may occur during a given I/O device read or I/O device write operation.

At the beginning of each storage/buffer transfer operation, MSAR 150 is set or loaded by IPU 14 to contain the three lowest order address bits of the complete starting byte address for the main storage 25. These three lowest order address bits identify which of the eight bytes in a storage word is to be used as the starting byte. They do not, of course, identify the storage word in question. In other words, MSAR 150 does not include the complete main storage address but only the three lowest order bits thereof. For convenience in explaining the operation of the FIG. 15 apparatus, these three low order address bits are labeled as bits 5-7. This, however, is not their real bit numbers as they appear on the main storage address bus 29 (FIG. 2). For present purposes, the main thing is that they are the three lowest order address bits on the main storage address bus 29.

At the beginning of each of the storage/buffer operations for a given I/O device read or I/O device write operation, the CHDLR 151 is initially set or loaded by IPU 14 via control bus 46 to contain a binary representation of the number of data bytes to be transferred during such storage/buffer operation. In the majority of cases, CHDLR 151 will most likely be initially loaded to contain a value of sixty-four, this being the number of bytes to be transferred for a full, as opposed to a partial, storage/buffer transfer operation.

The initial loading or resetting of registers 110, 150 and 151 is timed by T2 and T3 IPU clock pulses supplied by IPU 14. Upon occurrence of the next C1 channel clock pulse, the values in registers 110, 150 and 151 are set into respective ones of buffer registers 152, 153 and 154. STBA registers 110 and 152 have a width of eight bits, MSA registers 150 and 153 have a width of three bits and CHDL registers 151 and 154 have a width of eight bits. Relative to the other registers and for combining purposes, the MSA bits are treated as being located at bit positions 5, 6 and 7.

Considering first the transfer length determining mechanism portion of FIG. 15, this mechanism includes an eight's complement circuit 155 which receives the MSA bits and forms the eight's complement thereof. The relationship between the input bits and the output bits for the eight's complementer 155 is indicated in the following table:

| MSA Bits 5 - 7 | BL AMT. | BL Bits 4 - 7 |
|---|---|---|
| 000 | 8 | 1000 |
| 001 | 7 | 0111 |
| 010 | 6 | 0110 |
| 011 | 5 | 0101 |
| 100 | 4 | 0100 |
| 101 | 3 | 0011 |
| 110 | 2 | 0010 |
| 111 | 1 | 0001 |

The output of eight's complementer 155 (BL bits 4–7) is termed the boundary length (BL) value. This BL value is equal to the number of bytes needed to get to the next eight-byte or storage word boundary in the main storage 25. For the case of the FIG. 7A example, the MSA bits would have a value of 101 in accordance with the byte 5 starting byte position in the first storage word location. In such case, three more data bytes are needed to reach the next eight-byte boundary in the main storage 25. In this case, the eight's complementer 155 would have an output of 0011.

After the first data transfer for a given storage/buffer operation, MSAR 150 assumes a 000 value for the remainder of such storage/buffer operation because of the 000 value at the input thereof during the subsequent C3 channel clock pulses. This causes the BL value to assume a value of eight for all data transfers subsequent to the first data transfer. In other words, as far as the boundary length value is concerned, the first transfer gets you to an eight-byte boundary and subsequent transfers are full eight-byte transfers.

The data length (DL) value in CHDLB 154 is equal to the number of data bytes which remain to be transferred during a given storage/buffer operation. So long as the data length remaining to be transferred is not less than the boundary length value at the output of eight's complementer 155, the boundary length or BL value is passed by way of an AND circuit 156 and an OR circuit 157 and becomes the storage transfer length (STL) value on STL bus 158. The relationship between the BL and DL values is monitored by comparators 159 and 160. So long as the data length is equal to or greater than eight, the comparator 159 outputs a binary one level which is supplied by way of an OR circuit 161 to enable the BL gate 156. At the same time, the output of OR circuit 161 is inverted by a NOT circuit 162 to disable a DL gate 163. So long as the bits 5-7 portion of the data length is equal to or greater than the BL value, the comparator 160 outputs a binary one level which is also supplied by way of OR circuit 161 to enable the BL gate 156 and to disable the DL gate 163.

Whenever the data length value DL becomes less than the BL value, then the AND circuit 156 is disabled and the AND circuit 163 is enabled. This causes bits 4-7 of the DL value to be supplied to the STL bus 158 to become the STL value. In other words, whenever the data length DL remaining to be transferred becomes less than the data length needed to reach the next eight-byte boundary, then the DL data length value is used to provide the storage transfer length. Thus, the length to be transferred can never exceed the length remaining to be transferred.

Considering now the ST buffer address counter mechanism portion of FIG. 15, this mechanism includes STBAR 110, STBAB 152 and a binary adder 166. Adder 166 updates the current buffer address in STBAB 152 by adding thereto the current storage transfer length on bus 158. This provides at the output of adder 166 the storage transfer buffer address for the next channel cycle. This next buffer address is set into STBAR 110 by the next C0 clock pulse so as to become the then current storage transfer buffer address. The address value in STBAR 110 is supplied to the ST buffer address control unit 106 by way of an eight-bit bus 167 which includes both the bits 0-4 bus and the bits 5-7 bus shown in FIG. 9. A further point to note is that STBAR 110 is allowed to wrap back to zero when it reaches its maximum count condition. This enables the ST accessing of data into or out of the data buffer 20 to wrap back to Row 0 of buffer 20 as many times as may be needed when the I/O operation involves a relatively large length of data.

Considering now the data length counter mechanism portion of FIG. 15, such mechanism includes CHDLR 151, CHDLB 154 and a binary subtracter 168. Subtracter 168 subtracts from the current data length value in CHDLB 154 the current transfer length value on bus 158 to produce at the output of the subtractor 168 the data length value for the next channel cycle. This next DL value is set into CHDLR 151 by the next C0 clock pulse to become the then current DL value. A zero detector 169 monitors the output of the subtracter 168 and produces an ST END signal when the next DL value becomes zero. This ST END signal denotes the completion of the current storage/buffer operation and is supplied to the channel unit 11 to advise it of such fact. In response thereto, the channel unit 11 sends an ending signal to the main control unit 15 for purposes of completing and terminating the current storage/buffer operation.

Considering now the shift amount determining mechanism portion of FIG. 15, this mechanism includes a three-bit binary subtracter 170 and a shift amount register 171. Subtracter 170 subtracts the three lower order buffer address bits in STBAB 152 from the three low order main store address bits in MSAB 153 and the result appearing at the output of subtracter 170 is equal to the amount of shift that should be provided by the byte shifter 30 (FIG. 2) to provide the proper storage alignment for the particular one of the data buffer 20 and the main storage 25 to which the data is being transferred. This 3-bit shift amount signal is set into the shift amount register 171 by the first C2 clock pulse for the current storage/buffer operation. As indicated by FIGS. 7A-7E, the shift amount remains the same throughout any given storage/buffer operation and, hence, further settings of the shift amount register 171 are not required. It can be shown, however, that the correct 3-bit value nevertheless appears at the output of subtracter 170 during each of the subsequent C2 clock pulses should it be desired to allow the shift amount register 171 to be set by each C2 pulse.

With reference to the example of FIG. 7A, the three low order main store address bits have a value of 101 and the three low order buffer address bits have a value of 000. Thus, the difference appearing at the output of subtracter 170 has a value of five, which is the amount of right shift which is required to produce the data alignment needed by the main storage 25. For the case of FIG. 7B, the three low order main store address bits have a value of 000 and the three low order buffer store address bits have a value of 011. When the latter is subtracted from the former in a three-bit subtracter, the output is 101, which is again a value of five. Thus, a right shift of five byte positions is also needed for the eight-byte transfer of FIG. 7B.

The shift amount in register 171 is supplied to the shift control unit 45 of FIG. 2 by way of the bus 172. Shift control unit 45 sets the byte shifter 30 to provide the amount of shift specified by the shift amount register 171. For the case of a buffer-to-storage transfer, the direction of shift provided by byte shifter 30 is a right shift. For the case of a storage-to-buffer transfer, on the other hand, the direction of shift for the byte shifter 30 is a left shift. The direction of shift is indicated to the shift control unit 45 by the main control unit 15 in accordance with whether an I/O Read operation or an I/O Write operation is being performed.

Figure 16:
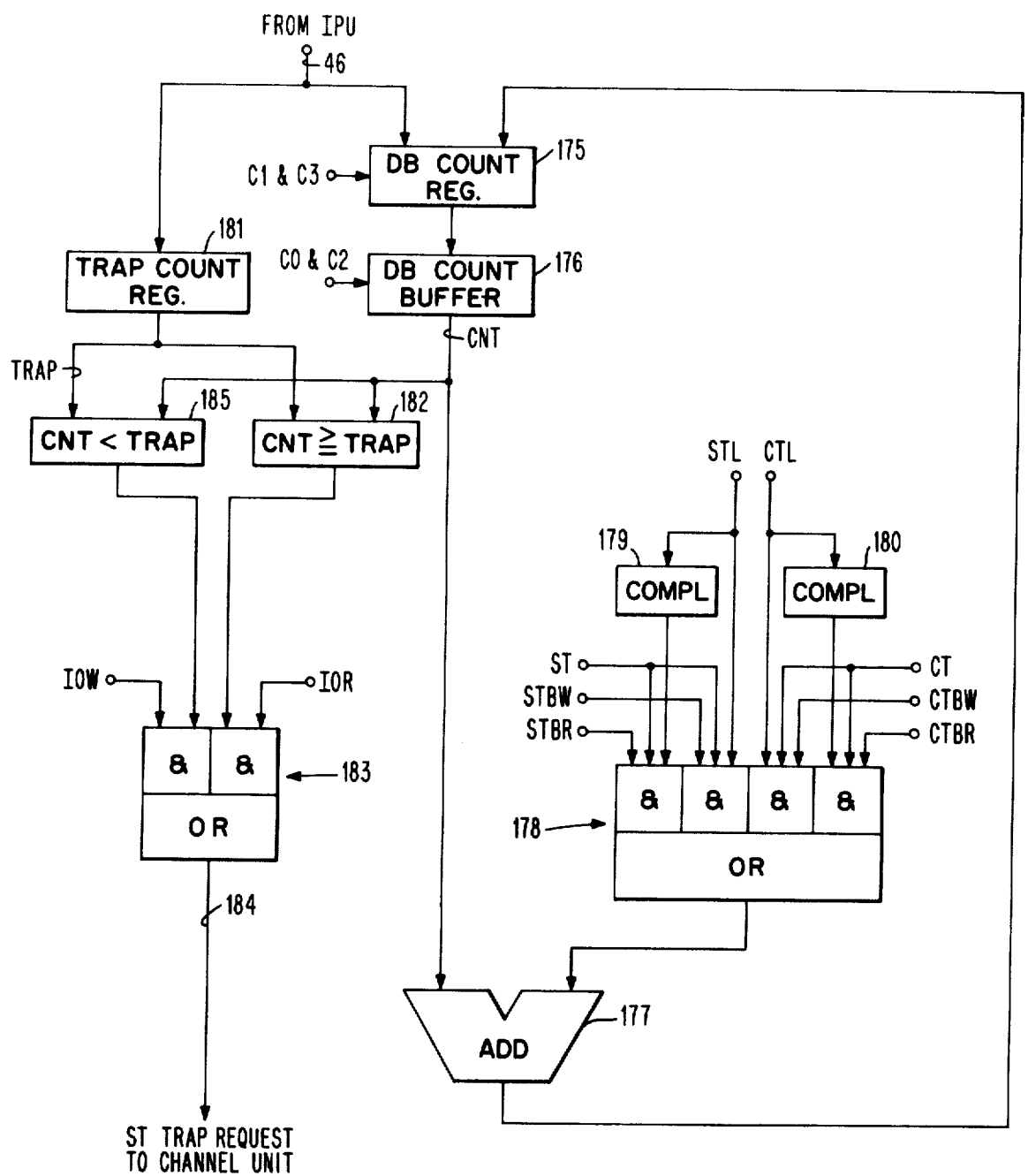

Referring now to FIG. 16 of the drawings, there is shown in greater detail the construction of the data buffer count control unit 109 of FIG. 5a. As shown in FIG. 16, unit 109 includes a bidirectional data buffer count mechanism which is responsive to the number of data bytes written into and read out of the data buffer 20 for keeping a running count of the number of unread data bytes currently contained in the data buffer 20. This data buffer count mechanism includes an eight-bit data buffer count register 175, an eight-bit data buffer count 176, an eight-bit binary adder 177 and increment/decrement logic 178. The data buffer count register 175 is initially reset to an all-zero value during the preliminary steps for a new I/O device operation. This is accomplished by an all-zero value supplied thereto from the IPU 14 by way of the control bus 46. Thereafter, the DB count register 175 is capable of being updated during each half of each channel cycle (C1 and C3 clock pulses) in accordance with the storage transfer length (STL) and channel transfer length (CTL) values which may exist during their respective half-cycle portions. In this regard, either or both of the STL and CTL values may be zero for any given channel cycle, in which case, the update factor (increment or decrement factor) has a value of zero. In other words, the count in data buffer count register 175 is not necessarily changed during each half-cycle interval. It is changed only when data is transferred into or out of the buffer 20 during such half-cycle interval.

The increment/decrement logic 178 causes the count value in count register 175 to be increased each time data is written into the data buffer 20. If the data being written is from the main storage 25 (STBW = 1), then the count in register 175 is increased by the STL value. If the data being written is from the channel unit 11 (CTBW = 1), then the count in register 175 is increased by the CTL value. The increment/decrement logic 178 further causes the count value in count register 175 to be decreased each time data is read out of the data buffer 20. If the data being read out is for transfer to the main storage 25 (STBR = 1), then the count in register 175 is decreased by adding thereto the complement of the STL value provided by complementer 179. If, on the other hand, the data being read out is for transfer to the channel unit 11 (CTBR = 1), then the count in register 175 is decreased by adding thereto the complement of the CTL value provided by complementer 180. In this manner, the data buffer count register 175 is caused to provide a running count of the number of unread data bytes in the data buffer 20.

The data buffer count control unit 109 also includes a trap count register 181 which is loaded by means of count values supplied thereto from the IPU 14 via control bus 46. This register 181 is initially loaded during the performance of the preliminary steps immediately following the fetching of a new START I/O instruction or a command chain from a previous CCW. It is thereafter reloaded as part of the ending sequence for each storage/buffer transfer operation so as to prepare it for the next storage/buffer transfer operation.

The data buffer count control unit 109 further includes comparator circuitry 182 coupled to the data buffer count buffer 176 and to the trap count register 181 for use during an I/O Read operation for issuing a trap request signal for initiating a buffer-to-storage transfer operation when the unread buffer count (CNT) equals or exceeds the predetermined count (TRAP) set into the trap count register 181. For the case of an I/O Read operation, the count set into the trap count register 181 by IPU 14 is equal to the number of data bytes needed to get to the next 64-byte boundary in the main storage 25, with the exception that if the data length to be transferred or remaining to be transferred is not enough to get to the next 64-byte boundary, then the count value set into the trap count register 181 is equal to the data length to be transferred or remaining to be transferred. The 64-byte boundaries in the main storage 25 are the boundaries located on the low sides of those byte locations whose addresses are multiples of sixty-four. The trap request signal generated by comparator 182 is supplied by way of an assembler 183 (the IOR control line being at the active level) and signal line 184 to the channel unit 11. The channel unit 11, in turn, passes this trap request and other pertinent control information, such as the channel trap address, to the main control unit 15. This trap request tells the main control unit 15 that there is enough data in the data buffer 20 to commence a buffer-to-storage transfer operation. In response thereto, the microprogram in the main control unit 15 branches to the necessary trap routine for initiating and carrying out the buffer-to-storage transfer operation.

For the case of an I/O Write operation, there is provided a further comparator 185 for issuing a trap request signal for initiating a storage-to-buffer transfer operation whenever the number of unread data bytes in the data buffer 20 falls below a predetermined value, such value being set into the trap count register 180 by the IPU 14. For the present case of a data buffer 20 having a capacity of 256 bytes, this predetermined trap value may be, for example, a value of 176. The trap request generated by comparator 185 is also supplied by way of the assembler 183 (IOW being at the active level) and the output line 184 to the channel unit 11. This trap request tells the channel unit 11, and hence the main control unit 15, that the data buffer 20 could use some more data. If there is any more data remaining to be transferred to the data buffer 20, then the microprogram in the main control unit 15 branches to the appropriate trap routine. If not, the trap request is ignored by the channel unit 11.

The operation of the data processing system shown in FIG. 2 and, in particular, the operation of the channel data buffer apparatus shown in FIGS. 5a and 5b will now be described for the case of the representative I/O Read operation illustrated in FIGS. 6A–6F and FIGS. 7A–7E. In this example, it is desired to read a total of seventy-nine bytes (bytes 0–78) of data from an I/O device 10 and to transfer it by way of the channel unit 11 and the data buffer 20 to the main storage 25. For present purposes, this I/O Read operation is considered as commencing when the IPU 14 sends the appropriate read type channel command to the channel unit 11. This channel command can be issued either as a result of the fetching of a START I/O instruction from the main storage 25 or as a result of a command chain from a previous channel command word. Immediatey following issuance of the new channel command to the channel unit 11, certain preliminary steps are performed by the I/O Read microprogram routine which is, at this time, being executed in the main control unit 15. In particular, IPU 14 is operated to set each of STBAR 110 (FIG. 15), CTBAR 124 (FIG. 14) and the data buffer count register 175 (FIG. 16) to a value of zero. The setting of STBAR 110 and CTBAR 124 to zero enables the storing in and reading out of data for the data buffer 20 to start at the Byte 0 column of Row 0 therein.

The first objective of the overall 79-byte I/O Read operation is to get to the next 64-byte boundary in the main storage 25. For the example shown in FIGS. 7A–7E, this requires a partial storage/buffer transfer operation for transferring the first eleven data bytes (bytes 0–10) to the main storage 25. Since eleven bytes are required to get to the next 64-byte boundary, the IPU 14, as a further preliminary step, sets a count value of eleven into the trap count register 181 (FIG. 16). The IPU 14 then signals the channel unit 11 that it may begin the actual transfer of data to the data buffer 20. Thereafter, the channel unit 11 begins transferring data to the buffer 20 one or two bytes at a time in the manner indicated in FIGS. 6A–6F. In other words, either one or two bytes of data is set into the channel-in data register 21 (FIG. 5b) during each channel cycle. In each case, the CTBAR 124 (FIG. 14) is incremented in accordance with the amount of data transferred, such amount being indicated by the channel transfer length (CTL) signal. Likewise, the count value in DB count register 175 (FIG. 16) is incremented each cycle in accordance with the CTL value.

The buffer-to-storage transfer mechanism remains inactive until after the number of bytes required to reach the first 64-byte boundary have been written or stored into the data buffer 20. The storing of enough bytes, in this case eleven bytes, into the data buffer 20 is signaled by the issuance of the ST trap request signal by the comparator 182 (FIG. 16). The channel-to-buffer transfers are not affected by this trap request and the channel unit 11 continues to send data to the data buffer 20 until such time as the entire data length, in this case the entire seventy-nine bytes, has been transferred to the data buffer 20. In this manner, the channel-to-buffer transfers are carried out independently of the buffer-to-storage transfers. Also, after the channel-to-buffer transfers have been commenced, the IPU 14 may return to other tasks pending occurrence of the ST trap request.

The issuance of the ST trap request by the data buffer count control unit 109 causes the main control unit 15 to thereafter commence execution of a buffer-to-storage partial transfer operation microprogram routine. This microprogram routine performs the partial (less than 64-byte) transfer operation depicted in FIGS. 7A and 7B. As a preliminary step in this routine, the main storage starting address for the buffer-to-storage transfer is read out of the local store 34 and set into the channel SAR 47. At the same time, the IPU 14 sends the three lowest order main store address bits for this same address to the main store address register 150 in the ST counter and control unit 105 (FIG. 15). As a further preliminary step, IPU 14 loads the channel data length register 151 (FIG. 15) with the data length to be transferred to the main storage 25 for the FIGS. 7A–7B partial transfer operation. In this example, CHDLR 151 is loaded with a value of eleven. At this point, the storage microword proper is reached in the control unit 15 and the address in channel SAR 47 is loaded into the main storage SAR 26. At this point, the actual movement of data from the data buffer 20 to the main storage 25 begins.

This movement of data is controlled by the ST counter and control unit 105 by means of the mechanisms shown in FIG. 15. In particular, the shift amount determining mechanism determines that a shift of five bytes should be provided by the byte shifter 30 and the shift control unit 45 is so advised. At the same time, the transfer length determining mechanism 155–163 determines that the storage transfer length for the first channel cycle (FIG. 7A) has a value of three. For the first cycle, the all-zero value in STBAR 110 causes an addressing of only Row 0 of the data buffer 20. Thus, the contents of Row 0 are accessed during the first channel cycle and set into STDR 23 (FIG. 5b). The eight data bytes in STDR 23 are then wrap mode shifted five byte positions to the right by byte shifter 30 and thereafter set into the main storage data register 27 (FIG. 2). The next write in to the main storage 25 writes in only those bytes contained in the three rightmost byte positions in MSDR 27. This occurs because of the control action provided by byte select unit 28 (FIG. 2) in response to the main storage starting address. This write in to the main storage 25 brings the data written in up to the next eight-byte boundary in the main storage 25.

At the beginning (C0 clock pulse) of the next channel cycle (FIG. 7B), STBAR 110 and CHDLR 151 are updated by the STL value for the first cycle. In particular, the buffer address value in STBAR 110 is increased by three counts and the data length value in CHDLR 151 is decreased by three counts. By this time, the main store address value in MSAR 150 has been set to zero. The next group of data bytes is then read out of data buffer 20 and transferred to the main storage 25 in the same manner as for the first group, with the exception that the STL value for the second group is eight. Also, in this second cycle case (FIG. 7B), the address value of three in STBAR 110 causes a two-row accessing of the data buffer 20 in the manner indicated in FIG. 7B. By this time, the next data length value at the output of subtractor 168 (FIG. 15) has reached a value of zero. This causes the zero detector 169 to issue an ST END signal which is sent to the channel unit 11 which, in turn, advises the main control unit 15 that the partial storage transfer operation has been completed. This terminates the storage microword and causes the buffer-to-storage transfer microprogram routine to perform an ending sequence and then to return control of the IPU 14 to whatever task was being performed before the occurrence of the ST trap request.

At some point before the return to the next processor task, the buffer/storage transfer microroutine performs various housekeeping chores relating to the I/O operation. For one thing, the CCW Byte Count field stored in the IPU local store 34 (FIG. 2) is decremented by the number of data bytes, in this case eleven, transferred during the transfer operation. Also, the CCW Data Address field in the local store 34 is incremented in accordance with the amount of data transferred during the transfer operation. In addition, the trap count register 181 (FIG. 16) is loaded to contain the count value needed for the next buffer-to-storage transfer operation. In the present example, the next transfer operation (FIGS. 7C and 7D) is a full 64-byte transfer operation, so the trap count register 181 is loaded to contain a value of sixty-four.

After completion of the buffer-to-storage partial transfer operation microroutine, the buffer-to-storage transfer mechanism remains inactive until the issuance of the next ST trap request by the data buffer count control unit 109. This next trap request initiates the full (64-byte) transfer operation, the first and last cycles of which are represented by FIGS. 7C and 7D. This full transfer operation is performed in the same manner as the partial transfer operation described above except that the channel data length register 151 (FIG. 15) is initially loaded with a value of sixty-four and the three-bit main store address register 150 (FIG. 15) is loaded with a value of 000. This occurs because the main storage 25 is now on an eight-byte boundary. Because of the larger number loaded into CHDLR 151, data is transferred to the main storage 25 for a greater number of channel cycles, namely, eight cycles. In other words, there are in this case eight successive eight-byte transfers of data from the data buffer 20 to the main storage 25. This brings the main storage 25 up to the second sixty-four byte boundary and the ST END signal generated by zero detector 169 (FIG. 15) causes the microprogram routine for this buffer-to-storage full transfer operation to perform an ending sequence and to return control of IPU 14 to other tasks. The buffer-to-storage transfer mechanism then remains inactive until another ST trap request is issued by the data buffer count control unit 109.

In the present example, the next ST trap request initiates the buffer-to-storage partial transfer operation indicated in FIG. 7E. In this case, only four bytes are transferred and only one cycle is required.

The example of FIGS. 7A-7E represents and I/O Read operation wherein the overall length of data to be transferred (the initial CCW Byte Count value) is relatively small and only a single full 64-byte transfer operation is required. It should be borne in mind, however, that a goodly number of input/output operations will involve an overall data length of several or many thousand bytes. In such a case, many full 64-byte transfer operations will take place for a single I/O Read or I/O Write operation. As a consequence, there is a considerable saving in time with respect to the performance of the I/O related housekeeping chores. Such chores will be performed only once for each 64-byte storage/buffer transfer.

From the foregoing description of a representative embodiment of the invention, it is seen that channel data buffer apparatus constructed in accordance with the present invention enables the packing of data into and the removal of data from an array type data buffer in a manner which simplifies the data handling and minimizes the hardware needed for such purpose, particularly where the data is supplied in segments of a first size and removed in segments of a second and different size. Further, such data buffer apparatus operates in a highly efficient manner in either direction, that is, either for a small segment write in and a large segment read out or, conversely, for a large segment write in and a small segment read out.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

Claims

What is claimed is:

1. In a data processing system having channel circuitry for sending data to and receiving data from input/output devices and a main storage unit for storing data to be processed, the apparatus comprising:
   a data buffer for buffering data being transferred between the channel circuitry and the main storage unit, this data buffer being structured to electrically provide a plurality of columns and rows, each column thereof being comprised of a byte-wide multiple row storage array having its own address mechanism for accessing any desired one of the rows therein, the corresponding rows in the different arrays serving to provide plural-byte rows for the data buffer as a whole;
   plural-byte data transfer circuitry for transferring plural-byte data segments between the data buffer and at least one of the channel circuitry and the main storage unit;
   and data buffer address circuitry operatively coupled to said main storage unit and said channel circuitry for supplying a plural-bit address obtained therefrom to the address mechanism of each storage array and including circuitry for modifying the address supplied thereby to at least one of the address mechanisms when said plural-bit address requires simultaneous accessing of a plural-byte storage segment located on two different rows of two columns the data buffer.

2. Apparatus in accordance with claim 1 wherein:
   the data buffer is structured to electrically provide M columns and R rows of byte-wide storage locations, where M and R are integers which are powers of two, and each column is comprised of a byte-wide storage array of R rows having its own address mechanism for accessing any desired one of the rows therein;

the plural-byte data transfer circuitry is M-byte data transfer circuitry for transferring M-byte data segments between the data buffer and the main storage unit and the individual byte positions in this transfer circuitry are coupled to different ones of the M column-forming storage arrays;

and the data buffer address circuitry supplies on r-bit address to the address mechanism of each of the column-forming storage arrays, where r is the logarithm to the base two of R, and the data buffer address circuitry includes circuitry for increasing by a count of one the address supplied to at least one of the storage array address mechanisms when it is required to access an M-byte storage segment located on two adjacent rows of the data buffer.

3. Apparatus in accordance with claim 2 and further comprising:

M-byte wrap-around data shifter circuitry included in the M-byte data transfer circuitry for shifting the data bytes being transferred by the number of byte positions needed to provide the proper storage alignment for the particular one of the data buffer and the main storage unit to which the data is being transferred.

4. Apparatus in accordance with claim 2 wherein the data buffer address circuitry includes:

a storage transfer buffer address register for providing a multibit data buffer address for addressing a desired starting byte location in the data buffer;

circuitry responsive to the set of r higher order address bits in the storage transfer buffer address register for producing a modified set of higher order address bits having a value one count higher than the unmodified set;

selector circuitry for supplying to the address mechanism for each of the M storage arrays one of the unmodified set or modified set of higher order address bits;

and selector control circuitry coupled to the selector circuitry and responsive to the set of m lower order address bits in the storage transfer buffer address register, where m is the logarithm to the base two of M, for determining which set of higher order address bits is supplied to each of the M storage array address mechanisms.

5. Apparatus in accordance with claim 4 and further including:

M-byte wrap-around data shifter circuitry included in the M-byte data transfer circuitry for shifting the data being transferred;

and shift amount determining circuitry responsive to the lower order address bits of both the data buffer address and the main storage address for supplying a shift amount control signal to the shifter circuitry.

6. Apparatus in accordance with claim 5 wherein M has a value of eight, m has a value of three and R has a value greater than eight.

7. Apparatus in accordance with claim 1 wherein:

the data buffer is structured to electrically provide M columns and R rows of byte-wide storage locations, where M and R are integers which are powers of two, and each column is comprised of a byte-wide storage array of R rows having its own address mechanism for accessing any desired one of the rows therein;

the plural-byte data transfer circuitry is N-byte data transfer circuitry for transferring N-byte data segments between the data buffer and the channel circuitry, where N is an integer;

and the data buffer address circuitry supplies an r-bit address to the address mechanism of each of the column-forming storage arrays, where r is the logarithm to the base two of R, and the data buffer address circuitry includes circuitry for increasing by a count of one the address supplied to at least one of the storage array address mechanisms when it is required to access an N-byte storage segment located on two adjacent rows of the data buffer.

8. Apparatus in accordance with claim 7 wherein:

N has a value of two and M has a value greater than two;

the data transfer circuitry includes an even-numbered byte position and an odd-numbered byte position with the even-numbered byte position being coupled to each of the storage arrays forming the even-numbered columns and the odd-numbered byte position being coupled to each of the storage arrays forming the odd-numbered columns;

the data buffer address circuitry includes a channel transfer buffer address register for providing a B-bit data buffer address for addressing a desired starting byte location in the data buffer, where B is the logarithm to the base two of the product of M times R;

and the apparatus further includes read/write control circuitry responsive to a set of lower order address bits in the channel transfer buffer address register for selecting one of the even-numbered storage arrays and one of the odd-numbered storage arrays for the data transfer.

9. Apparatus in accordance with claim 8 wherein:

the data buffer address circuitry further includes:

an odd array register for receiving the B-1 higher order address bits from the channel transfer buffer address register;

an even array register for receiving the B-1 higher order address bits from the channel transfer buffer address register;

incrementer circuitry for increasing the value in the even array register by a count of one when the lowest order bit in the channel transfer buffer address register has a value of one;

circuitry for supplying the set of r higher order address bits in the odd array register to the address mechanisms for the odd-numbered storage arrays;

and circuitry for supplying the set of r higher order address bits in the even array register to the address mechanisms for the even-numbered storage arrays;

and the read/write control circuitry includes:

odd array decoder circuitry coupled to the odd array register and responsive to a set of lower order address bits therein for selecting one of the odd-numbered storage arrays for the data transfer;

and even array decoder circuitry coupled to the even array register and responsive to a set of lower order address bits therein for selecting one of the even-numbered storage arrays for the data transfer.

10. Apparatus in accordance with claim 9 wherein M has a value of eight and R has a value greater than eight.

* * * * *

UNITED STATES PATENT OFFICE
CERTIFICATE OF CORRECTION

PATENT NO. : 4,131,940
DATED : December 26, 1978
INVENTOR(S) : James T. Moyer

It is certified that error appears in the above-identified patent and that said Letters Patent are hereby corrected as shown below:

Column 19, line 58, "applied" should read --supplied--.
Column 22, line 64, "of" 1st occurrence, should read --in--.
Column 30, line 46, "subtractor" should read --subtracter--.
Column 35, line 5, "subtractor" should read --subtracter--.
Column 36, Claim 1, line 62, after "columns" insert --of--.
Column 37, Claim 2 (continued), line 9, "on" should read --an--.

Signed and Sealed this

Eighth Day of May 1979

[SEAL]

Attest:

RUTH C. MASON
Attesting Officer

DONALD W. BANNER
Commissioner of Patents and Trademarks